United States Patent
Fuse et al.

(10) Patent No.: US 11,873,376 B2
(45) Date of Patent: Jan. 16, 2024

(54) FIBER-REINFORCED RESIN MATERIAL AND PRODUCTION METHOD THEREFOR

(71) Applicant: Toray Industries, Inc., Tokyo (JP)

(72) Inventors: Mitsuki Fuse, Nagoya (JP); Satoshi Seike, Nagoya (JP); Akihiko Matsui, Nagoya (JP); Kazuma Ura, Nagoya (JP)

(73) Assignee: Toray Industries, Inc., Tokyo (JP)

(*) Notice: Subject to any disclaimer, the term of this patent is extended or adjusted under 35 U.S.C. 154(b) by 444 days.

(21) Appl. No.: 17/287,171

(22) PCT Filed: Oct. 17, 2019

(86) PCT No.: PCT/JP2019/040831
§ 371 (c)(1),
(2) Date: Apr. 21, 2021

(87) PCT Pub. No.: WO2020/090488
PCT Pub. Date: May 7, 2020

(65) Prior Publication Data
US 2021/0388165 A1    Dec. 16, 2021

(30) Foreign Application Priority Data
Oct. 31, 2018 (JP) .................................. 2018-205380

(51) Int. Cl.
  *C08J 5/06* (2006.01)
  *B29B 15/10* (2006.01)
  *C08J 5/04* (2006.01)

(52) U.S. Cl.
  CPC ............... *C08J 5/06* (2013.01); *B29B 15/105* (2013.01); *C08J 5/042* (2013.01)

(58) Field of Classification Search
  CPC ..... B29C 15/105; B29C 15/122; B29C 15/10; C28J 5/06; C28J 5/042
  See application file for complete search history.

(56) References Cited

U.S. PATENT DOCUMENTS 10,738,168 B2    8/2020  Sonoda et al.
2010/0178495 A1  7/2010  Taketa et al.
(Continued)

FOREIGN PATENT DOCUMENTS

JP    2000-141502 A    5/2000
JP    2003-80519 A     3/2003
(Continued)

*Primary Examiner* — Alison L Hindenlang
*Assistant Examiner* — Virak Nguon
(74) *Attorney, Agent, or Firm* — DLA Piper LLP (US)

(57) ABSTRACT

A fiber-reinforced resin material used for molding a fiber-reinforced resin which includes a matrix resin and reinforcing fiber bundles A including chopped fiber bundles each including 100 or more single fibers, wherein the product of an average porosity within fiber bundles $P_{fav}$ (–) and an average fiber bundle thickness $t_{fav}$ (mm) is 0 mm or more and 0.01 mm or less and a porosity of composite $P_c$ (–) is 0.02 or more and 0.4 or less, and a method for producing the same. The fiber-reinforced resin material is a molding material excellent in terms of productivity and reduction in LCA, which can give high mechanical properties to a molded article using the molding material and further which is excellent also in flowability during molding.

9 Claims, 13 Drawing Sheets

(56) References Cited

U.S. PATENT DOCUMENTS

| | | | |
|---|---|---|---|
| 2012/0276383 A1* | 11/2012 | Hirano | C08G 18/6674 428/368 |
| 2014/0004308 A1* | 1/2014 | Taniguchi | B29C 43/18 428/156 |
| 2015/0064408 A1* | 3/2015 | Taniguchi | B29C 43/18 428/297.4 |
| 2017/0008260 A1 | 1/2017 | Fujii et al. | |
| 2017/0183465 A1 | 6/2017 | Kawabe et al. | |
| 2019/0161890 A1 | 5/2019 | Motohashi et al. | |
| 2019/0352474 A1 | 11/2019 | Fuse et al. | |
| 2020/0354532 A1 | 11/2020 | Seike et al. | |

FOREIGN PATENT DOCUMENTS

| | | |
|---|---|---|
| JP | 2006-207073 A | 8/2006 |
| JP | 5512908 B1 | 4/2014 |
| JP | 2016-27956 A | 2/2016 |
| JP | 5985085 B2 | 8/2016 |
| JP | 2017-205878 A | 11/2017 |
| WO | 2008/149615 A1 | 12/2008 |
| WO | 2017/221655 A1 | 12/2017 |
| WO | 2018/143067 A1 | 8/2018 |
| WO | 2019/146484 A1 | 8/2019 |

\* cited by examiner

Reinforcing filer bundle A

Reinforcing filer bundle A

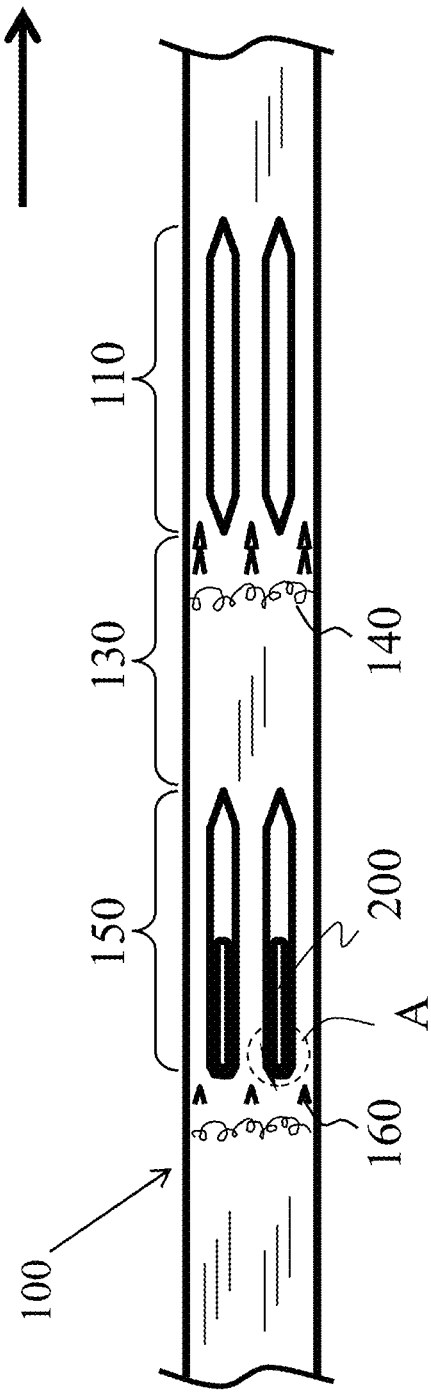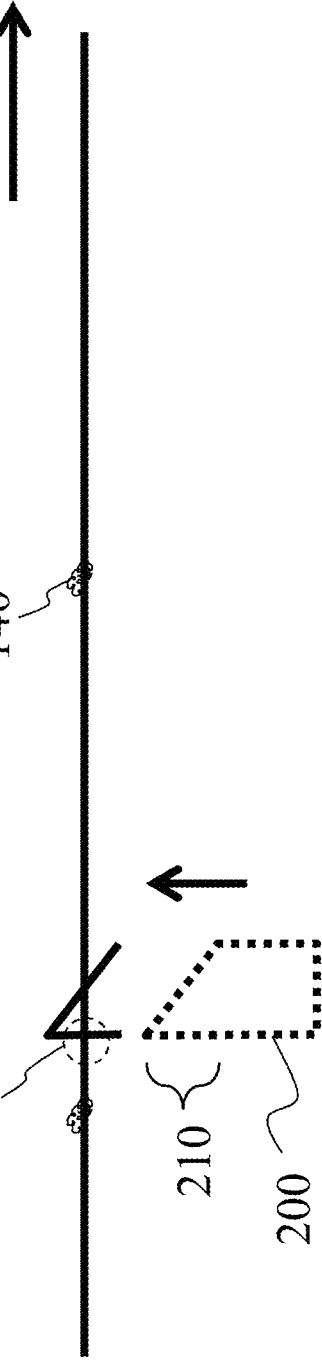

FIG. 4
 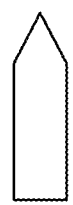  
(2a1)   (2a2)   (2a3)   (2a4)
  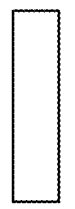 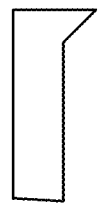
(2a5)   (2a6)   (2a7)   (2a8)

FIBER-REINFORCED RESIN MATERIAL AND PRODUCTION METHOD THEREFOR

TECHNICAL FIELD

This disclosure relates to a fiber-reinforced resin material excellent in mechanical properties, complicated shape moldability, and productivity, and a method of producing the same.

BACKGROUND

Among fiber-reinforced composite materials (FRP), a carbon fiber-reinforced composite material (CFRP) is excellent in specific strength and specific rigidity, and in recent years, the development of CFRP for automobile parts has been activated.

As an example of application of CFRP to automobiles, members due to prepregs, resin transfer moldings (RTM), and filament windings (FW) using thermosetting resins, which have a proven track record in aircraft and sports materials, have been put on the market. On the other hand, CFRP using a thermoplastic resin is paid attention to as a material for mass-produced vehicles because it can be molded at high speed and is excellent in recyclability. Among them, press molding has high productivity and can handle molding of complicated shapes or large areas. So, expectations are increasing as an alternative to metal molding.

As an intermediate base material used for press molding, for example, a sheet-like material using a discontinuous reinforcing fiber bundle having a length of several tens of mm is mainly used. As typical examples there are a sheet molding compound (SMC) and a glass mat thermoplastic (GMT) (JP-A-2000-141502 and JP-A-2003-80519). Both the intermediate base materials are used in so-called flow stamping molding, in which a material flows and is filled in a mold cavity, and they employ a form in that relatively long reinforcing fiber bundles are dispersed in the thermoplastic resin at a straight and/or curved state. However, since the reinforcing fiber bundle has a large number of single fibers, the flowability of the material (fibers or resin) at the time of molding tends to be excellent, but the mechanical properties of a molded article tend to be inferior.

As a material used in an attempt to improve both mechanical properties in CFRP and flowability during molding, there is a molding material having a multi-layer structure composed of sheets different in fiber length or fiber concentration parameter (JP-B-5985085). Further, there is a molding material in which mechanical properties are enhanced by adjusting a form such as a thickness or a width of a fiber bundle (JP-B-5512908). Thus, although improvements have been promoted to achieve a good balance between mechanical properties and flowability during molding, further improvements in mechanical properties and flowability are required.

Moreover, fiber-reinforced resins with few defects such as voids are required, and further, reduction of LCA (LCA: Life Cycle Assessment) and improvement of productivity of fiber-reinforced resins for cost reduction are also required. In JP-A-2016-27956, a semipreg sheet material in which a reinforcing fiber bundle is impregnated with a resin in advance for the purpose of improving productivity is cut to a required width and length, sprayed, and partially adhered to prepare a chopped semipreg sheet, but, since only a part of it is adhered, there is a problem in handleability such as the fiber bundle falling during lamination. Further, since the fibers are impregnated with resin in advance, force is required when cutting into chopped semipregs, which requires making the apparatus large-sized, accelerates the wear of the cutter for the cutting, and in addition, the resin impregnation process and the chopped semipreg bonding process are required, and since heating is required at the time of molding, heat energy is wasted significantly, and there is a problem that it becomes difficult to achieve cost reduction and LCA reduction.

Accordingly, it could be helpful to provide a fiber-reinforced resin material that is a molding material excellent in productivity and LCA reduction, and can give high mechanical properties to a molded article using such a molding material, and further, is excellent also in flowability during molding, and a method of producing the same.

SUMMARY

We thus provide:

[1] A fiber-reinforced resin material used for molding a fiber-reinforced resin which comprises a matrix resin and reinforcing fiber bundles A comprising chopped fiber bundles each including 100 or more single fibers, characterized in that the product of an average porosity within fiber bundles $P_{fav}$ (−) represented by equation (1) and an average fiber bundle thickness $t_{fav}$ (mm) represented by equation (2) is 0 mm or more and 0.01 mm or less and a porosity of composite $P_c$ (−) represented by equation (3) is 0.02 or more and 0.4 or less.

$$P_{fav} = \frac{1}{n}\sum_{i=1}^{n} \frac{p_{2i}}{v_{f2i} + v_{m2i} + p_{2i}} \quad (1)$$

$$t_{fav} = \frac{1}{n}\sum_{i=1}^{n} t_{fi} \quad (2)$$

$$P_c = \frac{\sum_{j=1}^{k} p_{1j} + \sum_{i=1}^{n} p_{2i}}{\sum_{x=1}^{l} v_{f1x} + \sum_{i=1}^{n}(v_{f2i} + v_{m2i} + p_{2i}) + v_{m1} + \sum_{j=1}^{k} p_{1j}} \quad (3)$$

i=1, 2, ... n, j=1, 2, ... k, x=1, 2, ... l, which are integers, and n, k, l represent, respectively, the number of all fiber bundles A, the number of voids, and the number of fibers other than the fiber bundles A included in a photographed sectional view. Each parameter is:

- $v_{f1}$: area occupied by fibers other than fiber bundles A (mm²)
- $v_{f2}$: area occupied by fibers in fiber bundles A (mm²)
- $v_{m1}$: resin layer area (mm²)
- $v_{m2}$: resin area in fiber bundles A (mm²)
- $p_1$: area of voids present in resin layer (mm²)
- $p_2$: area of voids present in fiber bundles A (mm²)
- $t_f$: thickness of fiber bundle A (mm), and each parameter is a value calculated from image analysis after binarization of a sectional view prepared by observing a section of a cut surface of the fiber-reinforced resin material in its thickness direction with an optical microscope, and photographing it at effective pixels of 1,600 (H)×1,200 (V) and a photograph magnification of 300 times.

[2] The fiber-reinforced resin material according to [1], wherein the product of the porosity $P_f$ (−) within the fiber bundle A represented by equation (4) and the thickness $t_f$ (mm) of the fiber bundle A is 0 mm or more and 0.03 mm or less.

$$P_f = \frac{p_2}{v_{f2} + v_{m2} + p_2} \quad (4)$$

[3] The fiber-reinforced resin material according to [1] or [2], wherein the reinforcing fiber bundle A is a chopped fiber bundle of a reinforcing fiber bundle having a number of fibers per unit width of 500 fibers/mm or more and 1,600 fibers/mm or less and a drape value defined as follows of 120 mm or more and 240 mm or less.

Drape value: a shortest distance between a tip of a reinforcing fiber bundle protruding by 250 mm from an end of a table and a side surface of the table measured at a condition where a sample of the reinforcing fiber bundle having a length of 300 mm is fixed on the end portion of the table of a rectangular parallelepiped in an atmosphere of 23±5° C.

[4] The fiber-reinforced resin material according to any one of [1] to [3], wherein a number average number of fibers of the reinforcing fiber bundles A is 100 or more and 4,000 or less.

[5] The fiber-reinforced resin material according to any one of [1] to [4], wherein a number average fiber length of the reinforcing fiber bundles A is 5 mm or more and 100 mm or less.

[6] The fiber-reinforced resin material according to any one of [1] to [5], wherein a weight ratio of the reinforcing fiber bundles A to all the reinforcing fibers is more than 99% by weight and 100% by weight or less.

[7] The fiber-reinforced resin material according to any one of [1] to [6], wherein the average fiber bundle thickness $t_{fav}$ of the reinforcing fiber bundles A is 0.01 mm or more and 0.3 mm or less.

[8] The fiber-reinforced resin material according to any one of [1] to [7], wherein an average lamination number of fiber bundles, which is a number average of the reinforcing fiber bundles A laminated in the thickness direction of the fiber-reinforced resin material, is 10 bundles/mm or more and 100 bundles/mm or less.

[9] The fiber-reinforced resin material according to any one of [1] to [8], wherein the matrix resin is a thermoplastic resin.

[10] A method of producing a fiber-reinforced resin material, which comprises the following steps [A] to [C]:

[A] a step of manufacturing a reinforcing fiber bundle aggregate in which reinforcing fiber bundles A comprising chopped fiber bundles each including 100 or more single fibers are randomly oriented two-dimensionally, each of the reinforcing fiber bundles having a number of fibers per unit width of 500 fibers/mm or more and 1,600 fibers/mm or less and a drape value defined as follows of 120 mm or more and 240 mm or less,

[B] a step of spraying, laminating, or applying a matrix resin onto the reinforcing fiber bundle aggregate, and

[C] a step of impregnating the matrix resin.

Drape value: a shortest distance between a tip of a reinforcing fiber bundle protruding by 250 mm from an end of a table and a side surface of the table measured at a condition where a sample of the reinforcing fiber bundle having a length of 300 mm is fixed on the end portion of the table of a rectangular parallelepiped in an atmosphere of 23±5° C.

[11] The method of producing a fiber reinforced resin material according to [10] used for molding a fiber-reinforced resin comprising a matrix resin and reinforcing fiber bundles A, wherein, by heating a laminated base material obtained by laminating the reinforcing fiber bundles A and the matrix resin at a laminated base material center temperature of (Tm+20) ° C. or higher and (Td−10) ° C. or lower for 60 seconds or more and 330 seconds or less, and thereafter, cooling and solidifying the laminated base material at a condition of a clearance of L or more and 1.4 L or less when a theoretical thickness of the fiber-reinforced resin material when completely impregnated so that there are no voids is referred to as L, the matrix resin is impregnated into the reinforcing fiber bundles A so that the product of an average porosity within fiber bundles $P_{fav}$ (−) represented by equation (1) and an average fiber bundle thickness $t_{fav}$ (mm) represented by equation (2) becomes 0 mm or more and 0.01 mm or less and a porosity of composite $P_c$ (−) represented by equation (3) becomes 0.02 or more and 0.4 or less.

$$P_{fav} = \frac{1}{n} \sum_{i=1}^{n} \frac{p_{2i}}{v_{f2i} + v_{m2i} + p_{2i}} \quad (1)$$

$$t_{fav} = \frac{1}{n} \sum_{i=1}^{n} t_{fi} \quad (2)$$

$$P_c = \frac{\sum_{j=1}^{k} p_{1j} + \sum_{i=1}^{n} p_{2i}}{\sum_{x=1}^{l} v_{f1x} + \sum_{i=1}^{n} (v_{f2i} + v_{m2i} + p_{2i}) + v_{m1} + \sum_{j=1}^{k} p_{1j}} \quad (3)$$

Tm: a melting point temperature of the matrix resin, Td: a decomposition temperature of the matrix resin, and L: a theoretical thickness of the fiber-reinforced resin material when completely impregnated so that there are no voids.

i=1, 2, ... n, j=1, 2, ... k, x=1, 2, ... l, which are integers, and n, k, l represent, respectively, the number of all fiber bundles A, the number of voids, and the number of fibers other than the fiber bundles A included in a photographed sectional view. Each parameter is:

$v_{f1}$: area occupied by fibers other than fiber bundles A (mm$^2$)

$v_{f2}$: area occupied by fibers in fiber bundles A (mm$^2$)

$v_{m1}$: resin layer area (mm$^2$)

$v_{m2}$: resin area in fiber bundles A (mm$^2$)

$p_1$: area of voids present in resin layer (mm$^2$)

$p_2$: area of voids present in fiber bundles A (mm$^2$)

$t_f$: thickness of fiber bundle A (mm), and each parameter is a value calculated from image analysis after binarization of a sectional view prepared by observing a section of a cut surface of the fiber-reinforced resin material in its thickness direction with an optical microscope, and photographing it at effective pixels of 1,600 (H)×1,200 (V) and a photograph magnification of 300 times.

[12] The method of producing a fiber-reinforced resin material according to [10] or [11], wherein the laminated base material is heated at a laminated base material center temperature of (Tm+40) ° C. or higher and (Td−10) ° C. or lower for 50 seconds or more and 230 seconds or less.

[13] The method of producing a fiber-reinforced resin material according to any one of [10] to [12], wherein the reinforcing fiber bundle aggregate comprises reinforcing fiber bundles A each having a number average fiber length of 5 mm or more and 100 mm or less.

[14] The method of producing a fiber-reinforced resin material according to any one of [10] to [13], wherein a weight ratio of the reinforcing fiber bundles A in the reinforcing fiber bundle aggregate is more than 99% by weight and 100% by weight or less.

[15] The method of producing a fiber-reinforced resin material according to any one of [10] to [14], wherein the reinforcing fiber bundle aggregate is manufactured so that an average lamination number of fiber bundles, which is a number average of the reinforcing fiber bundles A laminated in the thickness direction, is 10 bundles/mm or more and 100 bundles/mm or less.

A fiber-reinforced thermoplastic resin molding material can thus be provided that is a molding material excellent in productivity, can impart excellent mechanical properties to a molded article using such a molding material, and is excellent also in flowability during molding.

BRIEF DESCRIPTION OF THE DRAWINGS

FIG. 3 shows a schematic plan view (A) and a schematic side view (B) showing an example of a partially separated fiber bundle in which a fiber bundle has been subjected to a separation processing.

FIG. 4 is an explanatory view showing examples of a shape of a projected part of a separation means.

EXPLANATION OF SYMBOLS

Figure 1:
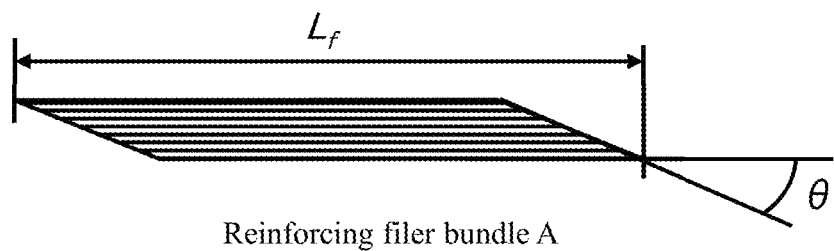
FIG. 1 is a diagram showing an example of a reinforcing fiber bundle A forming a fiber-reinforced resin material.

100: fiber bundle
110: separation-processed section
130: not-separation-processed section
140: fluff accumulation
150: separation-processed part
160: entangled part
180: separated fiber bundle
200: separation means
210: projected part
211: contact part
300: separation processing step
301: fiber bundle widening step
400: sizing agent providing step
401: sizing agent application step
402: drying step
403: heat treatment step
501: fibers other than fiber bundle
502: fibers within fiber bundle
503: resin layer
504: resin in fiber bundle
505: voids present in resin layer
506: voids present in fiber bundle
601: sample of reinforcing fiber bundle
602: table

DETAILED DESCRIPTION

It is important that the fiber-reinforced resin material mainly comprises reinforcing fiber bundles A comprising chopped fiber bundles each including 100 or more single fibers and a matrix resin, and has voids so that a composite porosity $P_c$ as a volume porosity becomes 0.02 or more. This porosity $P_c$ (−) is preferably 0.05 or more, and more preferably 0.07 or more. When the porosity $P_c$ is less than 0.02, it takes a long time to impregnate when the fiber-reinforced resin material is produced, and high-speed production may not be possible and LCA reduction may not be achieved. On the other hand, it is important that the upper limit of the porosity $P_c$ is 0.4 or less, and it is preferably 0.2 or less, more preferably 0.1 or less. That the porosity $P_c$ exceeds 0.4 means that the impregnation property of the matrix resin is poor, the voids may remain when the fiber-reinforced resin molded article is molded, and there is a possibility that the mechanical properties may be decreased. The composite porosity $P_c$ is determined by equation (3).

$$P_c = \frac{\sum_{j=1}^{k} p_{1j} + \sum_{i=1}^{n} p_{2i}}{\sum_{k=1}^{l} v_{f1x} + \sum_{i=1}^{n}(v_{f2i} + v_{m2i} + p_{2i}) + v_{m1} + \sum_{j=1}^{k} p_{1j}} \quad (3)$$

$v_{f1}$ is an area occupied by fibers other than fiber bundles A (mm²), $v_{f2}$ is an area occupied by fibers in fiber bundles A (mm$^2$), $v_{m1}$ is a resin layer area (mm$^2$), $v_{m2}$ is a resin area in fiber bundles A (mm$^2$), $p_1$ is an area of voids present in resin layer (mm$^2$), and $p_2$ is an area of voids present in fiber bundles A (mm$^2$), and i, j, x represent, respectively, integers of i=1, 2, . . . n, j=1, 2, . . . k, x=1, 2, . . . 1, and n, k, 1 represent, respectively, the number of all fiber bundles A, the number of voids, and the number of fibers other than the fiber bundles A included in a photographed sectional view.

Each of the above-described parameters is a value calculated from image analysis after binarization of a sectional view prepared by observing a section of a cut surface of the fiber-reinforced resin material in its thickness direction with an optical microscope, and photographing it. Concretely, after the fiber-reinforced resin material is cut in the thickness direction, and polished to clean the cut surface, the cut surface is observed in section with an optical microscope. When the fiber-reinforced resin material is embedded when polishing, it is necessary to perform a treatment such as wrapping an impregnation prevention tape around the fiber-reinforced resin material so that the embedding resin does not enter the voids of the fiber-reinforced resin material. Next, the cut surface is photographed at effective pixels of 1,600 (H)×1,200 (V) and a photographing magnification of 300 times to obtain a sectional view. The brightness threshold of the obtained sectional view is set, the area is determined by binarization, and the respective parameters $v_{f1}$, $v_{f2}$, $v_{m1}$, $v_{m2}$, $p_1$, and $p_2$ can be calculated, respectively. The volume porosity was calculated assuming that the area ratio in the sectional view is equivalent to the volume ratio. The fiber bundle A means a fiber aggregate composed of 100 or more reinforcing fibers. A range that can be observed at one time is, for example, about 850×1,100 μm (0.85×1.1 mm), and in measuring a cut surface size: 2×50 mm, about 150 photographs are joined together for the measurement. It is preferred to photograph at a condition where the images are lapped a little to each other so that they can be overlapped when joining the images together.

Since the brightness of the above-described brightness threshold differs depending on the image at the time of photographing, it is necessary to appropriately set the brightness threshold for each image.

Further, the above-described fiber-reinforced resin material has voids so that the product of an average porosity within fiber bundles $P_{fav}$ (−) and an average fiber bundle thickness $t_{fav}$ (mm) represented by equations (1) and (2) becomes 0 mm or more and 0.01 mm or less. The product of the average porosity within fiber bundles $P_{fav}$ and the average fiber bundle thickness $t_{fav}$ is preferably 0 mm or more and 0.005 mm or less, and more preferably 0 mm or more and 0.003 mm or less. If the product of the average porosity within fiber bundles $P_{fav}$ and the average fiber bundle thickness $t_{fav}$ is more than 0.01 mm, the impregnation property of the matrix resin is poor, the moldability is poor, or voids remain in the bundles when molding a fiber-reinforced resin molded article, and this means that there is a possibility that the mechanical properties may decrease.

$$P_{fav} = \frac{1}{n}\sum_{i=1}^{n} \frac{p_{2i}}{v_{f2i} + v_{m2i} + p_{2i}} \quad (1)$$

$$t_{fav} = \frac{1}{n}\sum_{i=1}^{n} t_{fi} \quad (2)$$

$t_f$ is the thickness (mm) of the reinforcing fiber bundle A in the above-described fiber-reinforced resin material. The thickness $t_f$ of the reinforcing fiber bundle A is defined by, from a sectional view obtained by observing the section of the fiber-reinforced resin material, referring to a fiber bundle composed of 100 or more fibers as one bundle, measuring the thickness of the thickest portion in the direction orthogonal to the bundle width of the fiber bundle, and referring to the measured thickness as the thickness $t_f$ of the reinforcing fiber bundle A. Further, from the sectional view, in the fiber bundle, the fiber area $v_{f2}$ (mm$^2$) in the fiber bundle A, the resin area $v_{m2}$ (mm$^2$) in the fiber bundle A, and the porosity void area $p_2$ (mm$^2$) in the fiber bundle A can be determined by binarization, and the porosity $P_f$ (−) in the fiber bundle can be determined from the area ratio. The thicknesses $t_f$ and area ratios of at least 200 reinforcing fiber bundles A are measured, and the number average value of the measured thicknesses $t_f$ (mm) of the reinforcing fiber bundles A is referred to as the average fiber bundle thickness $t_{fav}$ (mm) and the number average value of the determined p porosities $P_f$ (−) in the fiber bundles (equation (4)) is referred to as the average porosity within fiber bundles $P_{fav}$ (−).

Furthermore, in the fiber-reinforced resin material, it is preferred that the product of the porosity $P_f$ (−) in the fiber bundle A and the thickness $t_f$ (mm) of the fiber bundle A is 0 mm or more and 0.03 mm or less, more preferably 0 mm or more and 0.02 mm or less, and further preferably 0 mm or more and 0.01 mm or less. If the product of the porosity $P_f$ in the fiber bundle A and the thickness $t_f$ of the fiber bundle A becomes more than 0.03 mm, it means that the impregnation property of the matrix resin into the fiber bundle A is poor and there is a possibility that the mechanical properties of a fiber-reinforced resin molded article decrease.

$$P_f = \frac{p_2}{v_{f2} + v_{m2} + p_2} \quad (4)$$

Fiber Content

In the fiber-reinforced resin material, a fiber volume content $V_f$ (−) represented by equation (5) of 0.07 or more, preferably 0.14 or more, more preferably 0.23 or more, and the upper limit is 0.55 or less, preferably 0.5 or less, and more preferably 0.45 or less. If it is within this range, the flowability of the fiber-reinforced resin material and the mechanical properties of the molded article can be enhanced.

$$V_f = \frac{\sum_{x=1}^{l} v_{f1x} + \sum_{i=1}^{n} v_{f2i}}{\sum_{x=1}^{l} v_{f1x} + \sum_{i=1}^{n} (v_{f2i} + v_{m2i} + p_{2i}) + v_{m1} + \sum_{j=1}^{k} p_{1j}} \quad (5)$$

Fiber Bundle Thickness

The average fiber bundle thickness $t_{fav}$ (mm) of the reinforcing fiber bundles A constituting the fiber-reinforced resin material is preferably 0.01 mm or more, more preferably 0.02 mm or more, and further preferably 0.03 mm or more. If less than 0.01 mm, there is a fear that the flowability of the molding material is inferior. Further, the average fiber bundle thickness $t_{fav}$ (mm) of the reinforcing fiber bundles A constituting the fiber-reinforced resin molding material is preferably 0.3 mm or less, more preferably 0.15 mm or less, and further preferably 0.1 mm or less. If exceeding 0.3 mm, there is a fear that the mechanical properties of the molded article are inferior.

Kind of Fibers

Although the kind of reinforcing fibers forming the reinforcing fiber bundle is not restricted, carbon fibers, glass fibers, aramid fibers, and metal fibers are preferred. Among them, carbon fibers are preferred. Although the carbon fibers are not particularly limited, for example, carbon fibers such as polyacrylonitrile (PAN) type, pitch type, and rayon type can be preferably used from the viewpoint of improving mechanical properties and reducing the weight of a fiber-reinforced resin molded article, and these may be used alone or in combination of two or more. Among them, PAN-based carbon fibers are more preferable from the viewpoint of the balance between the strength and the elastic modulus of an obtained fiber-reinforced resin molded article. Fiber diameter The single fiber diameter of the reinforcing fibers is preferably 0.5 μm or more, more preferably 2 μm or more, further preferably 4 μm or more. Further, the single fiber diameter of the reinforcing fibers is preferably 20 μm or less, more preferably 15 μm or less, and further preferably 10 μm or less. The strand strength of the reinforcing fibers is preferably 3.0 GPa or more, more preferably 4.0 GPa or more, and further preferably 4.5 GPa or more. The strand elastic modulus of the reinforcing fibers is preferably 200 GPa or more, more preferably 220 GPa or more, and further preferably 240 GPa or more. When the strand strength or elastic modulus of the reinforcing fibers is in each range, respectively, the mechanical properties of the fiber-reinforced resin material can be enhanced.

Number of Fibers

The number average number of fibers of the reinforcing fiber bundles A constituting the fiber-reinforced resin material is preferably 4,000 or less, more preferably 3,000 or less, and further preferably 2,000 or less. When it is within this range, the mechanical properties of the fiber-reinforced resin material can be enhanced. Further, the lower limit of the number average number of fibers of the reinforcing fiber bundles A is preferably 100 or more, more preferably 150 or more, and further preferably 200 or more. When it is within this range, the flowability of the fiber-reinforced resin material can be improved.

Fiber Bundle Width

The lower limit of the number average bundle width of the reinforcing fiber bundles A constituting the fiber-reinforced resin material is preferably 0.03 mm or more, more preferably 0.05 mm or more, and further preferably 0.07 mm or more. Further, the upper limit of the number average bundle width of the reinforcing fiber bundles A constituting the fiber-reinforced resin material is preferably 3 mm or less, more preferably 2 mm or less, and further preferably 1 mm or less. When it is within this range, the flowability of the fiber-reinforced resin material and the mechanical properties of the molded article can be enhanced.

Fiber Bundle Structure

The lower limit of the number of fibers per unit width of the reinforcing fiber bundle A constituting the fiber-reinforced resin material is preferably 500 fibers/mm or more, more preferably 600 fibers/mm or more, and further 700 fibers/mm or more. Further, the upper limit of the number of fibers per unit width of the reinforcing fiber bundle constituting the fiber-reinforced resin material is preferably 1,600 fibers/mm or less, more preferably 1,400 fibers/mm or less, and further preferably 1,200 fibers/mm or less. When it is within this range, the flowability of the fiber-reinforced resin material and the mechanical properties of the molded product can be enhanced. The method of determining the number of fibers per unit width of the reinforcing fiber bundle constituting the fiber-reinforced resin material will be described later.

Fiber Length

Figure 2:
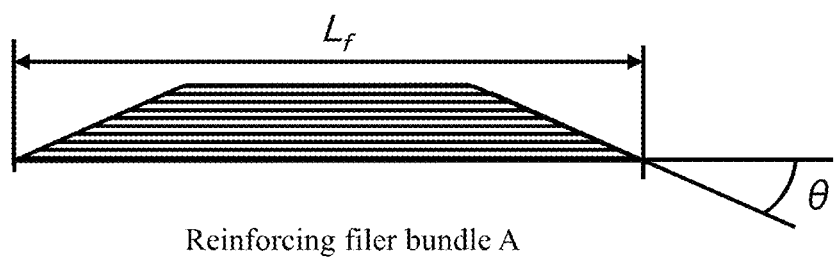
FIG. 2 is a diagram showing another example of a reinforcing fiber bundle A forming a fiber-reinforced resin material.

The reinforcing fiber bundle A constituting the fiber-reinforced resin material is a chopped reinforcing fiber bundle cut to a desired length. The number average fiber length of the chopped reinforcing fiber bundles A is preferably 5 mm or more, more preferably 7 mm or more, and further preferably 10 mm or more. The number average fiber length of the chopped fiber bundles A is preferably 100 mm or less, more preferably 50 mm or less, and further preferably 25 mm or less. If the number average fiber length of the reinforcing fiber bundles A is less than 5 mm, the mechanical properties when made into a fiber-reinforced resin material decrease. On the other hand, if the number average fiber length of the reinforcing fiber bundles A exceeds 100 mm, the moldability is lowered. To determine the number average fiber length, with respect to each of 100 chopped reinforcing fiber bundles A, the maximum length in the fiber direction of the reinforcing fiber bundle A is measured as a fiber length $L_f$, as shown in FIG. 1 or FIG. 2, and its arithmetic average value is referred to as the number average fiber length. In the reinforcing fiber bundle A shown in FIG. 1 or FIG. 2, both ends are cut (chopped) at an angle θ with respect to the longitudinal direction of the reinforcing fiber bundle.

Form of Fiber Bundle

Further, as shown in FIG. 1 or 2, the angle of the cut surface (cutting angle θ) of the reinforcing fiber bundle with respect to the fiber direction is preferably 3° or more, more preferably 4° or more, and further preferably 5° or more. If within this range, the fiber bundle can be cut stably. Further, it is preferably 30° or less, more preferably 25° or less, and further preferably 20° or less. If within this range, good flowability during molding and high mechanical properties of the molded article can be realized. θ is represented by an absolute value.

Bundle Ratio

The weight ratio of the reinforcing fiber bundles A each having 100 or more single fibers to all the reinforcing fibers constituting the fiber-reinforced resin material is preferably more than 99% by weight and 100% by weight or less. When the weight ratio of the reinforcing fiber bundles A is 99% by weight or less, there is a fear that the flowability of the molding material is inferior.

Lamination Number of Fiber Bundles

The lamination number of the reinforcing fiber bundles A constituting the fiber-reinforced resin material is an average number value of fiber bundles A that are laminated in the thickness direction of the fiber-reinforced resin material. The average lamination number of fiber bundles is preferably 10 bundles/mm or more, more preferably 15 bundles/mm or more, and further preferably 20 bundles/mm or more. When the average lamination number of fiber bundles is less than 10 bundles/mm, there is a fear that the mechanical properties of the molded article is inferior. On the other hand, the upper limit value is preferably 100 bundles/mm or less, more preferably 50 bundles/mm or less, and further preferably 30 bundles/mm or less. When it exceeds 100 bundles/mm, there is a fear that the flowability of the molding material is inferior.

Sizing

It is preferred that a sizing agent is applied to the reinforcing fiber bundle A constituting the fiber-reinforced resin material. Although the sizing agent is not particularly limited, one having a thermal decomposition start temperature of 200° C. or higher is preferable, one having a thermal decomposition start temperature of 250° C. or higher is more preferable, and one having a thermal decomposition start temperature of 300° C. or higher is further preferable. If within this range, decomposition of the sizing agent can be suppressed during molding, and the mechanical properties of the molded article can be enhanced. The method of determining the thermal decomposition start temperature of the sizing agent will be described later.

Concretely, as the sizing agent, a compound having a functional group such as an epoxy group, a urethane group, an amino group, or a carboxyl group can be used. Preferably, a sizing agent containing an epoxy resin as a main component or a sizing agent containing a polyamide resin as a main component is used. These may be used alone or in combination of two or more. Further, it is also possible to further treat the reinforcing fiber bundle by further applying a sizing agent different in kind from the sizing agent already applied to the reinforcing fiber bundle. The main component means a component that accounts for 70% by weight or more of the solute component.

As the kind of epoxy resin, one or two or more in combination of bisphenol A type epoxy resin, bisphenol F type epoxy resin, novolak type epoxy resin, aliphatic type epoxy resin, and glycidyl amine type epoxy resin can be used.

Further, as the polyamide resin, preferably a water-soluble polyamide resin can be used. For example, the water-soluble polyamide is preferably a polyamide resin obtained by condensation polymerization of a diamine having a tertiary amino group and/or an oxyethylene group in its main chain and a carboxylic acid, and as the diamine, a monomer containing a tertiary amino group in its main chain such as N, N'-bis (γ-aminopropyl) piperazine and N-(β-aminoethyl) piperazine having a piperazine ring, or an alkyl diamine containing an oxyethylene group in its main chain such as oxyethylene alkylamine, is useful. Further, as the dicarboxylic acid, adipic acid, sebacic acid and the like can be used.

The water-soluble polyamide may be a copolymer. As examples of the copolymerization component, for example, lactams such as α-pyrrolidone, α-piperidone, ε-caprolactam, α-methyl-ε-caprolactam, ε-methyl-ε-caprolactam, and ε-laurolactam, can be exemplified, and binary copolymerization or multiple-component copolymerization is also possible. The copolymerization ratio is determined within a range that does not interfere with the physical properties of water solubility. Preferably, the ratio of a copolymerization component having a lactam ring is set within 30% by mass, and the polymer is completely dissolved in water.

However, even in a polymer with a poor water solubility having a copolymerization component ratio outside the above-described range, when the solution is acidified by using an organic or inorganic acid, the solubility is increased, and the polymer becomes water-soluble and can be used. As the organic acid, acetic acid, chloroacetic acid, propionic acid, maleic acid, oxalic acid, fluoro-acetic acid and the like can be exemplified, and as the inorganic acid, hydrochloric acid, sulfuric acid, phosphoric acid and the like, which are general mineral acids, can be exemplified.

The adhesion amount of the sizing agent is preferably 5% by mass or less, more preferably 4% by mass or less, and further preferably 3% by mass or less, assuming that the reinforcing fiber bundle to which the sizing agent is adhered is 100% by mass. If the adhesion amount of the sizing agent exceeds 5% by mass, the fiber bundle lacks flexibility and becomes too hard, and there is a possibility that winding to a bobbin and unwinding from a bobbin become not smooth. In addition, single fiber cracking may occur at the time of cutting, and the ideal chopped fiber bundle form may not be obtained. The adhesion amount of the sizing agent is preferably 0.1% by mass or more, more preferably 0.3% by mass or more, and further preferably 0.5% by mass or more. When the adhesion amount of the sizing agent is less than 0.1% by mass, when trying to produce a fiber-reinforced resin material or a fiber-reinforced resin molded article, the adhesiveness between the matrix resin and the reinforcing fibers tends to decrease, and there is a possibility that the mechanical properties of the molded article may be lowered. Further, by decrease of the impregnation property, there is a possibility that the product of the average porosity within fiber bundles $P_{fav}$ and the average fiber bundle thickness $t_{fav}$ and the product of the porosity within fiber bundles $P_f$ and the fiber bundle thickness $t_f$ may exceed the upper limits, and there is a fear that the physical properties when made into a fiber-reinforced resin molded article may decrease.

By setting the adhesion amount of the sizing agent within the above-described range, effects such as improvement of unwinding property from a bobbin and reduction of wrapping around a nip roller and a cutter blade, for example, when cutting the fiber bundle with a cutter, can be obtained, and it is possible to improve the productivity. Further, it is possible to suppress the cut fiber bundle from being cracked or being dispersed with single fibers, and it is possible to obtain a uniform and optimum-formed chopped fiber bundle. Then, by this, since the fiber bundles are plane-oriented, the mechanical properties can be further improved. Furthermore, since it is possible to reduce the variation in areal weight of the bundled aggregate, it is possible to reduce the variation in mechanical properties of the molded article. The method of determining the adhesion amount of the sizing agent will be described later.

It is preferred that these sizing agents are uniformly adhered to the surface of the reinforcing fibers. Although the method of uniformly adhering is not particularly limited, for example, there are a method of dissolving the sizing agents in water, alcohol, or an acidic aqueous solution so that the concentration becomes 0.1% by mass or more, preferably 1% by mass to 20% by mass, and immersing the fiber bundle in the polymer solution (sizing agent treatment liquid) via a roller, a method of contacting the fiber bundle with a roller adhered with a sizing agent treatment liquid, a method of atomizing a sizing agent treatment liquid and spraying it onto the fiber bundle and the like. At this time, it is preferred to control the concentration of the sizing agent treatment liquid, the temperature, the thread tension and the like so that the sizing agent effective ingredient adheres uniformly to the fiber bundle within an appropriate range of amount. Further, it is more preferred to ultrasonically vibrate the fiber bundle when the sizing agent is applied.

To remove the solvent such as water and alcohol in the sizing agent adhered to the reinforcing fiber bundle, any method such as heat treatment, air drying, or centrifugation may be used, but among them, heat treatment is preferable from the viewpoint of cost. As the heating means for the heat treatment, for example, hot air, a hot plate, a roller, an infrared heater or the like can be used. Since this heat treatment condition affects the handleability and the adhesiveness with the thermoplastic resin which is a matrix material, it is also preferred to adjust the heat treatment temperature and time after the application of the sizing agent depending upon the components and the adhesion amount of the sizing agent.

In the aforementioned water-soluble polyamide, from the viewpoint of preventing thermal deterioration, it is preferred to dry under a condition of a room temperature to 180° C.

to remove moisture and then perform the heat treatment. The lower limit of the heat treatment temperature is preferably 130° C. or higher, more preferably 200° C. or higher. The upper limit of the heat treatment temperature is preferably 350° C. or lower, more preferably 280° C. or lower. This heat treatment temperature is a temperature at which the water-soluble polyamide is self-crosslinked by oxygen in the air or loses its water solubility. By this treatment, since the water-soluble polymer becomes insoluble and loses hygroscopicity, the strands bundled with filaments become not sticky, and not only the workability of post-processing is improved, but also adherence to the matrix material is improved and a fiber bundle easy to handle can be provided. Further, it is also possible to add a cross-linking accelerator to the solvent to lower the heat treatment temperature and shorten the time. Furthermore, it is also possible to increase the hardness of the fiber bundle by performing an aging treatment in an atmosphere of 23±5° C.

The sizing agent using a water-soluble polyamide resin is excellent in affinity with various matrix materials and significantly improves the composite physical properties and, in particular, in a polyamide-based resin, a polyimide-based resin, a polyamide-imide-based resin and a polyether amide imide-based resin, an excellent effect of improving adherence is exhibited.

As described in detail later, separation processing or widening treatment of the fiber bundle may be performed between the sizing agent application step and the drying step.

Method of Separation

A method of producing a partially separated fiber bundle for forming the fiber-reinforced resin material will be concretely explained with reference to an example. The partially separated fiber bundle should not be interpreted as being limited to the specific aspects disclosed below.

The partially separated fiber bundle is obtained through a step of unwinding the fiber bundle from an unwinding device or the like, thereafter widening the fiber bundle, and performing a separation processing. Hereinafter, each step will be described in detail.

First, the unwinding of the fiber bundle will be explained. The fiber bundle is unwound from an unwinding device or the like for unwinding a fiber bundle which is arranged on the upstream side in the fiber bundle traveling direction. As for the unwinding direction of the fiber bundle, although a laterally unwinding system for pulling out in a direction perpendicular to the axis of rotation of a bobbin and a longitudinally unwinding system for pulling out in the same direction as the axis of rotation of the bobbin (paper tube) are considered, the laterally unwinding system is preferred in consideration that in that system there are few unwinding twists.

Further, with respect to the installation posture of the bobbin at the time of unwinding, it can be installed in an arbitrary direction. In particular, when in a state where the bobbin is pierced through the creel, the end surface of the bobbin on the side not being the creel rotation shaft fixed surface is directed in a direction other than the horizontal direction, it is preferred that the fiber bundle is held in a state where a constant tension is applied to the fiber bundle. When there is no constant tension in the fiber bundle, it is considered that the fiber bundle falls from and is separated from a package (a winding body in which the fiber bundle is wound on the bobbin), or that a fiber bundle separated from the package winds around the creel rotation shaft, whereby unwinding becomes difficult.

Further, as a method of fixing the rotation shaft of the unwound package, in addition to the method of using a creel, a surface unwinding method is also applicable wherein a package is placed on two rollers arranged in parallel with each other at a state in parallel with the two parallel rollers, and the package is rolled on the arranged rollers to unwind a fiber bundle.

Further, in unwinding using a creel, a method of applying a tension to the unwound fiber bundle by applying a brake to the creel by putting a belt around the creel, fixing one end of the belt, and hanging the weight or pulling with a spring at the other end or the like, is considered. In this example, varying the braking force depending upon the winding diameter is effective as means of stabilizing the tension.

Next, the widening and separation processing steps will be explained. These steps may not always be performed constantly, and the width of widening may be varied at a constant cycle or at a desired location. Further, it is also possible to intermittently insert a separation blade into the widened fiber bundle to form a partially separated portion in the reinforcing fiber bundle.

FIG. 3 shows an example of separation processing. (A) is a schematic plan view and (B) is a schematic side view (B), and the fiber bundle is running from the left (upstream side) to the right (downstream side) of the figure. In the figure, a fiber bundle running direction (arrow) is the lengthwise direction of a fiber bundle 100, which shows that the fiber bundle 100 is continuously supplied from a fiber bundle supply device that is not shown in the figure. A separation means 200 is provided with a projected part 210 having a projecting shape which is easy to be penetrated into the fiber bundle 100, and which is penetrated into the traveling fiber bundle 100 to create a separation-processed part 150 approximately parallel to the lengthwise direction of the fiber bundle 100. It is preferred that the separation means 200 is penetrated in a direction along the side surface of the fiber bundle 100. The side surface of the fiber bundle means a surface in the vertical direction in a sectional end when the section of the fiber bundle is a flat shape such as a laterally elongated elliptical shape or a laterally elongated rectangular shape. Further, the number of projected parts 210 to be provided may be one for each single separation means 200 or may be plural. When there are a plurality of projected parts 210 in one separation means 200, because the abrasion frequency of the projected part 210 decreases, it becomes possible to reduce the frequency of exchange. Furthermore, it is also possible to simultaneously use a plurality of separation means 200 depending upon the number of fiber bundles to be separated. It is possible to arbitrarily dispose a plurality of projected parts 210 by arranging a plurality of separation means 200 in parallel, staggeringly, in shifted phases or the like.

When the fiber bundle 100 comprising a plurality of fibers (single fibers) is divided into separated bundles with a smaller number of fibers by the separation means 200, since the plurality of single fibers are substantially not aligned in the fiber bundle 100 but there are many portions interlaced at the single fiber level, there is an example where entangled parts 160, in which the single fibers are interlaced in the vicinity of the contact parts 211 during the separation processing, are formed. "Forming the entangled part 160" means, for example, forming (moving) the entanglement of single fibers with each other, which has been previously present in the separation-processed section, on the contact part 211 by the separation means 200, forming (producing) an aggregate, in which single fibers are newly interlaced, by the separation means 200 and the like.

After creating the separation-processed part 150 in an arbitrary range, the separation means 200 is removed from the fiber bundle 100. By this removal, a separation-processed section 110 performed with separation processing is created, and at the same time as that, the entangled parts 160 created as described above are accumulated in the end portion of the separation-processed section 110. Further, fluff generated from the fiber bundle during the separation processing become a fluff accumulation 140.

Thereafter, by penetrating the separation means 200 into the fiber bundle 100 again, the not-separation-processed section 130 is created and a partially separated fiber bundle is formed in which the separation-processed sections 110 and the not-separation-processed sections 130 are disposed alternately along the lengthwise direction of the fiber bundle 100.

The running speed of the fiber bundle 100 is preferably a stable speed with little fluctuation, more preferably a constant speed.

Figure 5A:
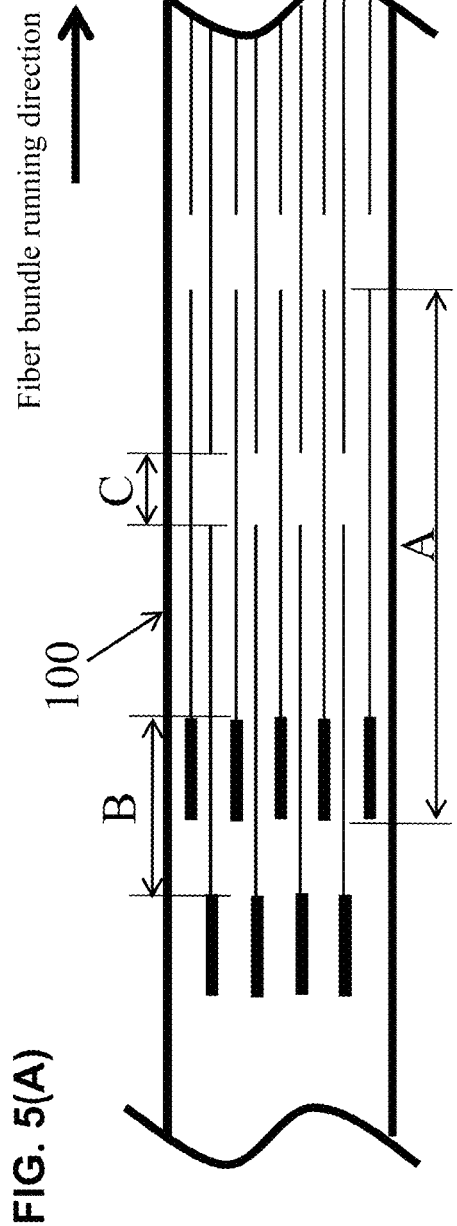
FIG. 5 shows a schematic plan view (A) and a schematic side view (B) showing a state in which projected parts of separation means staggeredly arranged have been inserted into a fiber bundle using a rotary-type separation means.
Figure 5B:
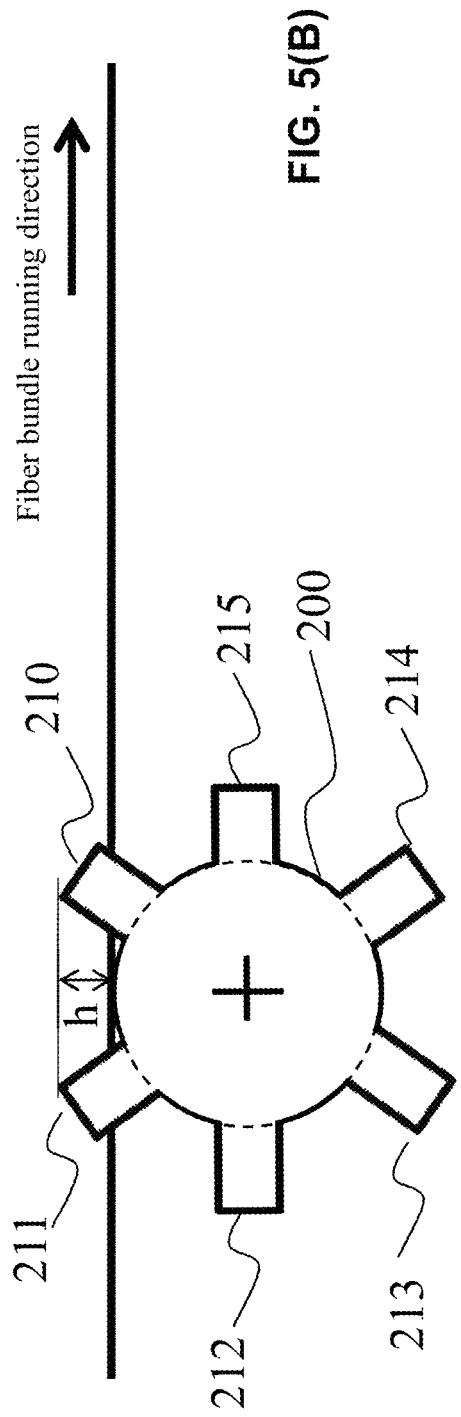
Figure 6A:
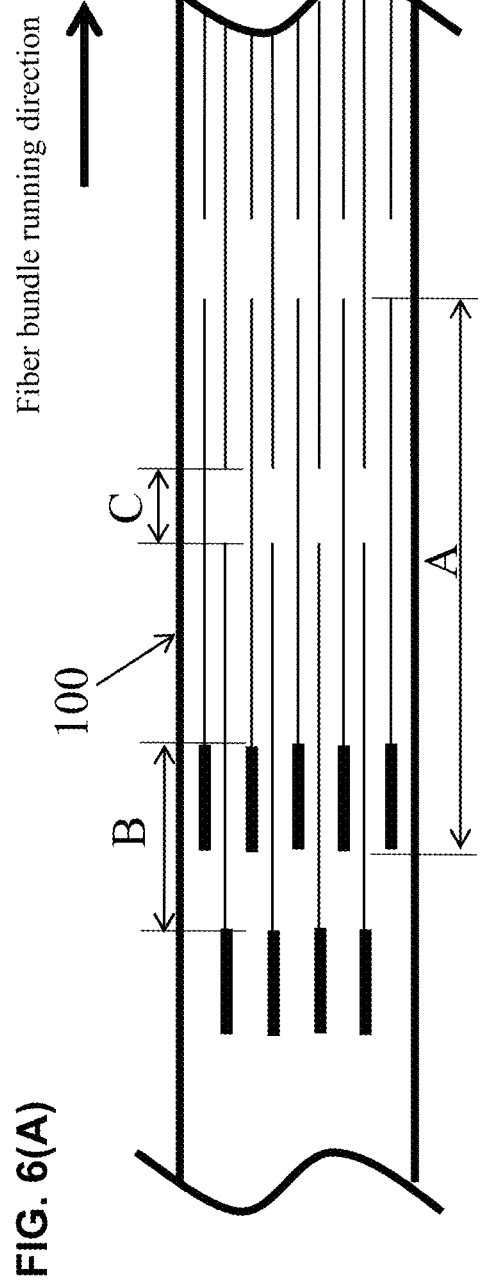
FIG. 6 shows a schematic plan view (A) and a schematic side view (B) showing a state in which projected parts of separation means staggeredly arranged have been inserted into a fiber bundle using a separation means comprising a plurality of vertical blades.
Figure 6B:
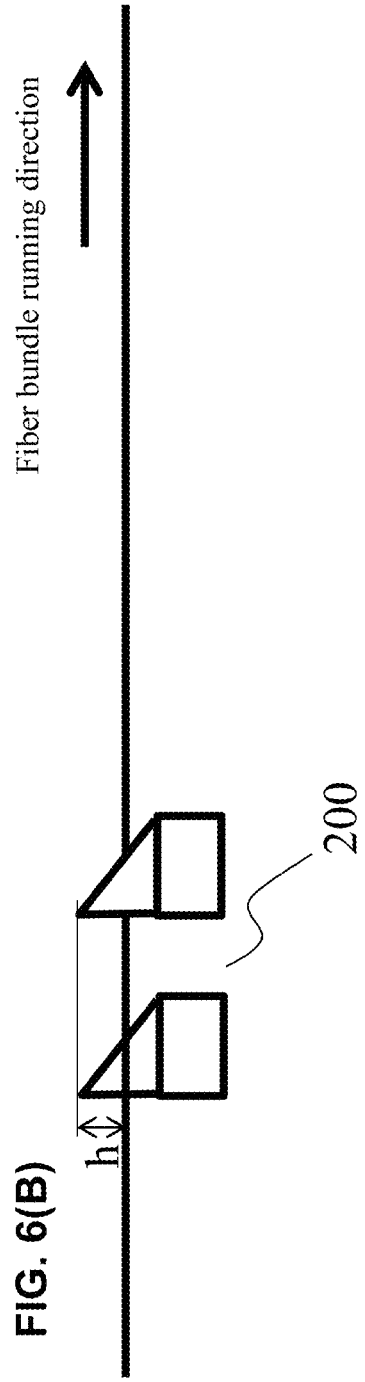

The separation means 200 is not particularly limited as long as the desired effect can be achieved, and it is preferable to have a projected part 210 with a shape like a sharp shape such as a metal needle or a thin plate. Concretely, it is preferably a projected part comprising a plurality of rotary blades as shown in FIG. 5, or a projected part comprising a plurality of vertical blades as shown in FIG. 6. The lower limit of the height h of the projected part, which is protruded from the surface of the fiber bundle, is preferably 5 mm or more, more preferably 7 mm or more, and further preferably 10 mm or more. The upper limit of the height h of the projected part, which is protruded from the surface of the fiber bundle, is preferably 50 mm or less, more preferably 45 mm or less, and further preferably 40 mm or less. If the height of the projected part is within this range, the separation device can be made small-sized, and the fiber bundle can be separated more stably. In the method of penetrating the projected part of the separation means into the fiber bundle, it may be penetrated obliquely to the fiber bundle, or may be penetrated from a different direction of either the front surface or the back surface of the fiber bundle.

Although the shape of the contact portion 211 at the tip of the projected part 210 with the fiber bundle 100 is not particularly limited as long as it can be penetrated, the shape as shown in FIG. 4 is preferred. The projected parts ($2a1$ to $2a3$) having a sharp tip have good penetration property, and the projected parts ($2a4$ to $2a6$) having an R shape at the tip are less likely to cause fluffs due to prevention of cutting of single fibers. In the projected part shown in ($2a7$, $2a8$), when it is used for a rotary-type separation means, the penetration property is particularly improved.

As to the separation means 200, it is preferred that a plurality of separation means 200 are provided in the width direction of the fiber bundle 100 which is performed with the separation processing, and the number of separation means 200 can be arbitrarily selected depending upon the number F of single fibers forming the fiber bundle 100 to be carried out with the separation processing. It is preferred that the number of separation means 200 is (F/10,000−1) or more and less than (F/50−1) with respect to the width direction of the fiber bundle 100. If it is less than (F/10,000−1), improvement in mechanical properties is hardly exhibited when a reinforcing fiber composite material is made in a later step, and if it exceeds (F/50−1), there is a possibility of yarn breakage or fluffing during the separation processing.

To adjust the interval of separation, it can be adjusted by the pitch of a plurality of separation means arranged and disposed in the width direction of the fiber bundle. By reducing the pitch of separation means and providing a larger number of separation means in the width direction of the fiber bundle, a separation processing into so-called thin bundles each having a smaller number of single fibers becomes possible. The lower limit of the clearance between a separation means and a separation means (hereinafter, a separation width) to form a thin bundle is preferably 0.1 mm or more, and more preferably 0.2 mm or more. Further, the upper limit of the separation width is preferably 10 mm or less. If the separation width is narrow such as less than 0.1 mm, the traveling direction of the separation means meanders due to fluffs or the like, and there is a fear that the separation means may be damaged due to contact. On the other hand, when the separation width exceeds 10 mm, though there is no fear that the separation means comes into contact with each other, the traveling direction may meander due to fluff, entanglement of single fibers or the like, and it may make it difficult to obtain a separation width of a certain width. Further, in being made into a molded article, there is a fear that the exhibition rate of mechanical properties may decrease.

Next, the separation means having a plurality of projected parts will be explained with reference to FIGS. 5 to 8.

FIGS. 5 and 6 show an example in which the positions of the separation means are shifted between the upstream side and the downstream side of the fiber bundle, FIG. 5 shows separation means each composed of a plurality of rotary blades, and FIG. 6 shows separation means each having a vertical blade. By thus arranging the separation means in a staggered manner, it is possible to suppress the generation of fluffs and produce a fiber bundle having a relatively uniform separation width. It is preferred that the length A (mm) of the separation-processed section due to the respective projected parts is 30 mm or more and 1,500 mm or less, the distance B (mm) between the projected parts on the upstream side and the downstream side is 20 mm or more and 1,500 mm or less, and the length C (mm) of the not-separation-processed section due to the respective projected parts is 1 mm or more and 150 mm or less. Within these ranges, the load on the separation device can be reduced, and a fiber bundle having a relatively uniform separation width can be produced.

When the positions of the separation means are shifted between the upstream side and the downstream side of the fiber bundle, it is preferred that there is at least one location where the arrangement interval of the projected parts of the separation means, arranged on the upstream side of the fiber bundle, in the direction orthogonal to the fiber bundle lengthwise direction is the same as the arrangement interval of the projected parts of the separation means, arranged on the downstream side of the fiber bundle, in the direction orthogonal to the fiber bundle lengthwise direction.

Figure 7A:
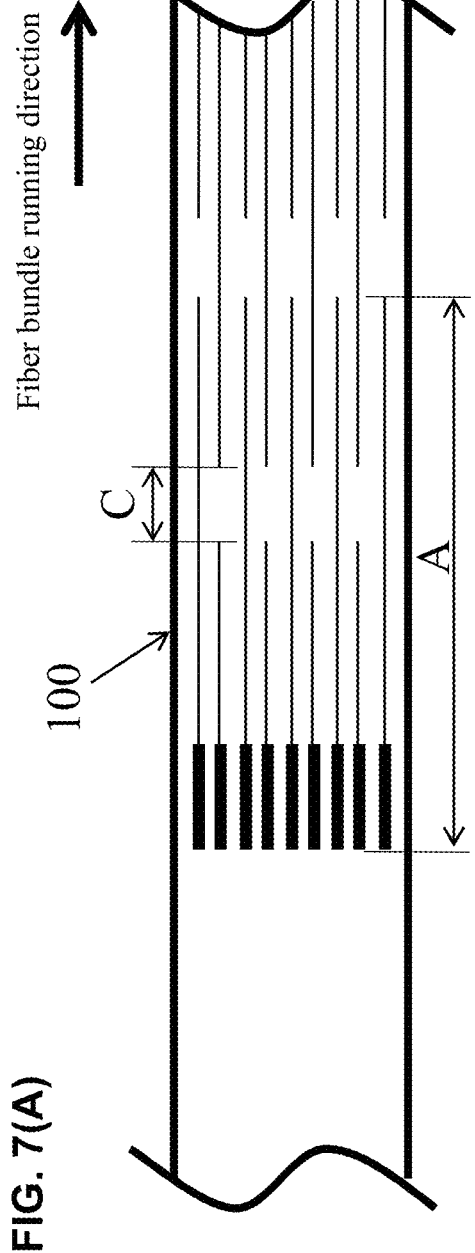
FIG. 7 shows a schematic plan view (A) and a schematic side view (B) showing a state in which separation means each comprising a plurality of vertical blades have been inserted into a fiber bundle at different timings.
Figure 7B:
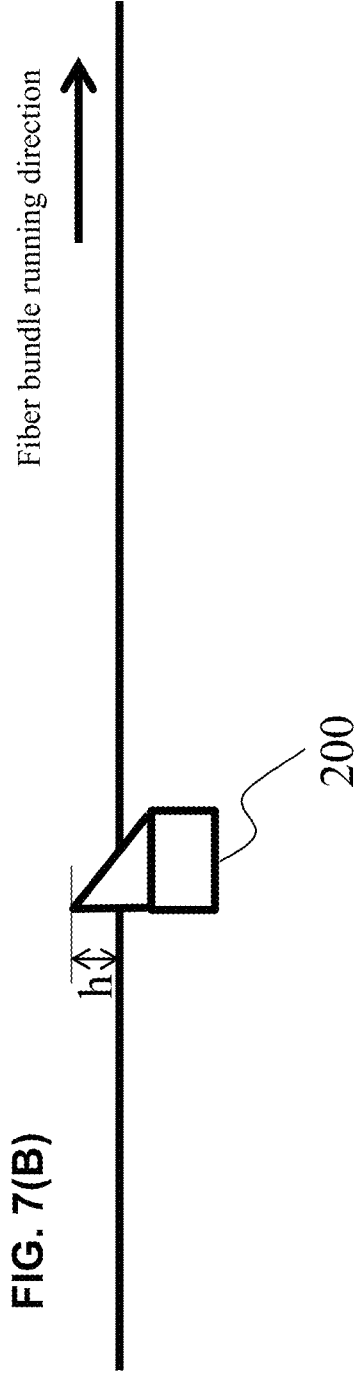

FIG. 7 shows an example in which a plurality of separation means are arranged parallel to the width direction of the fiber bundle, and the projected parts of the separation means are inserted and removed at different timings. The difference between the timings of inserting the projected parts of the adjacent separation means into the fiber bundle is preferably 0.2 cycle or more and 0.8 cycle or less, more preferably 0.3 cycle or more and 0.7 cycle or less, and further preferably, 0.4 cycle or more and 0.6 cycle or less. By inserting and removing in this range, it is possible to suppress generation of fluffs and produce a fiber bundle having a relatively uniform separation width. One cycle means the time from when the projected part is inserted into the fiber bundle to when the projected part is removed out and inserted again after a certain period of time has elapsed. It is preferred that the length A (mm) of the separation-processed section due to the projected part is 30 mm or more and 1,500 mm or less, and the length C (mm) of the not-separation-processed section due to the projected part is 1 mm or more and 150 mm or less. If within this range, the load on the separation device can be reduced, and a fiber bundle having a relatively uniform separation width can be produced.

Further, as shown in FIGS. 5 to 7, it is preferred to control the timing of inserting and removing the projected parts of the separation means so that a section where the fiber bundle is not separated does not occur over the entire width of the fiber bundle. By such a control, it is possible to produce a fiber bundle in which the width of each of the separated fiber bundles is relatively uniform.

Figure 8A:
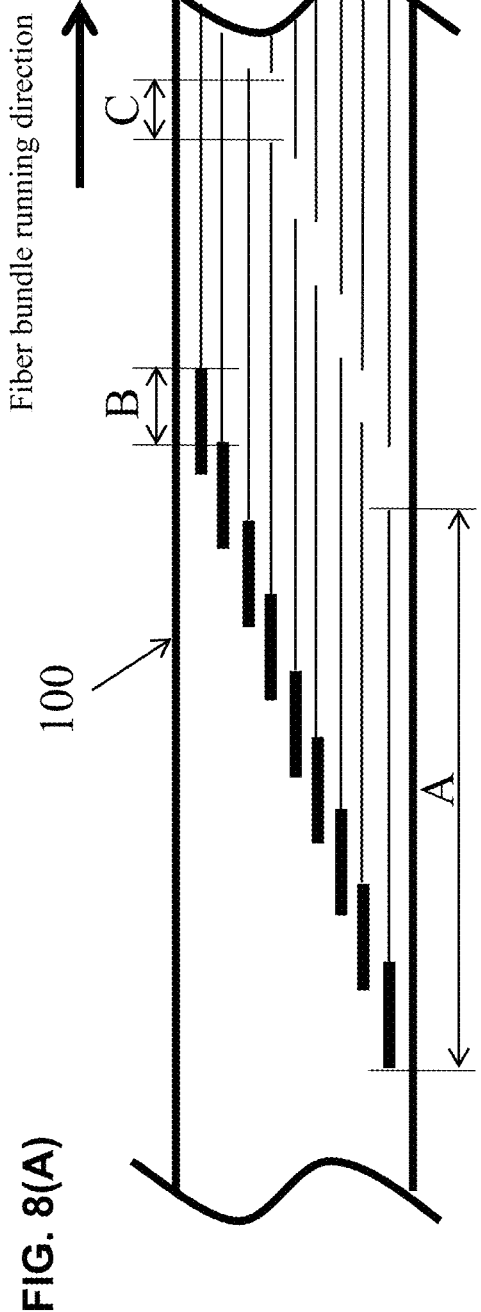
FIG. 8 shows a schematic plan view (A) and a schematic side view (B) showing a state in which a separation means comprising a plurality of vertical blades is used, and projected parts of the separation means arranged obliquely have been inserted into a fiber bundle.
Figure 8B:
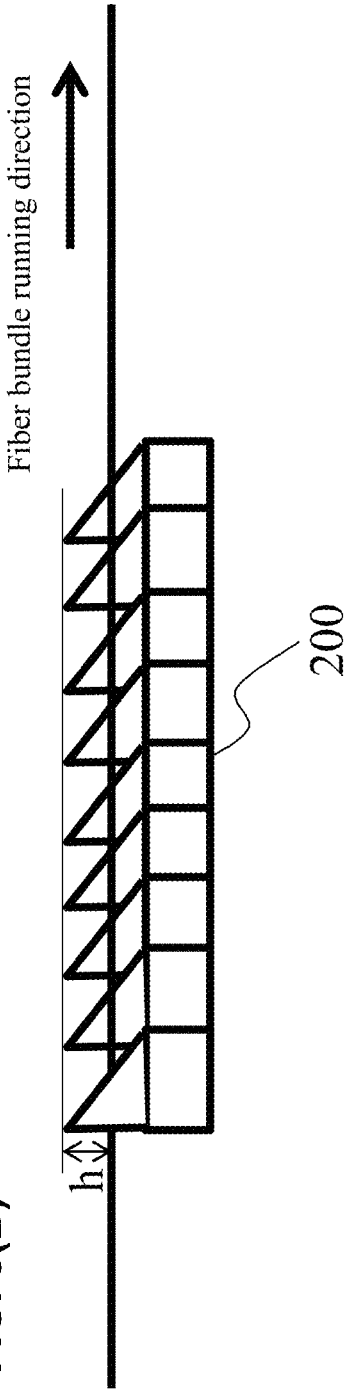

FIG. 8 shows an example in which a plurality of separation means are sequentially arranged in an oblique direction with respect to the width direction of the fiber bundle, and the projected parts of the separation means are simultaneously inserted and removed. It is preferred that the length A (mm) of the separation-processed section due to the projected part is 30 mm or more and 1,500 mm or less, the distance B (mm) between the projected parts on the upstream side and the downstream side is 5 mm or more and 1,500 mm or less, and the length C (mm) of the not-separation-processed section due to the projected part is 1 mm or more and 150 mm or less. If within these ranges, the load on the separation device can be reduced, and a fiber bundle having a relatively uniform separation width can be produced.

As shown in FIGS. 5 and 6, the ratio between the arrangement number of projected parts on the upstream side and the arrangement number of projected parts on the downstream side (the larger number of the arrangement number of projected parts is referred to as a numerator, and the smaller number of the arrangement number of projected parts is referred to as a denominator) is preferably 1 or more and 2.5 or less, more preferably 1 or more and 2 or less, and further preferably 1 or more and 1.5 or less. If the ratio between the arrangement number of projected parts on the upstream side and the arrangement number of projected parts on the downstream side is within this range, by making the width of the separated fiber bundle uniform, when formed into a molded article, it is possible to reduce the variation in mechanical properties. For the arrangement number of projected parts, a projected part may be counted as long as the shifted amount of the projected part present at one end portion of the arranged projected parts is within 5 mm along the lengthwise direction of the fiber bundle.

Sizing Agent Application Step

Next, the timing of providing a sizing agent will be explained.

Figure 9:
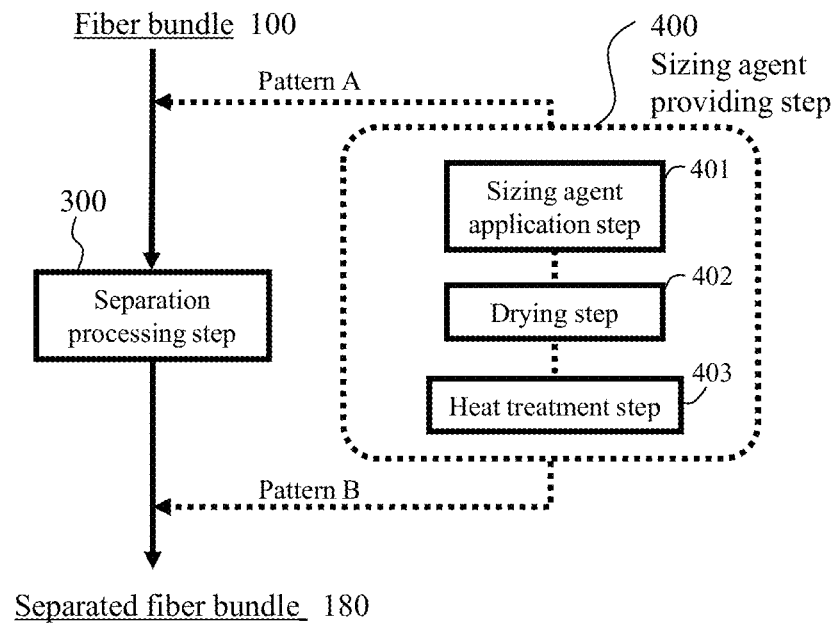
FIG. 9 is a process chart showing an example of a timing of sizing agent application to a reinforcing fiber bundle.

FIG. 9 shows a timing example of a sizing agent providing step 400 in the production process of the reinforcing fiber bundle forming a fiber-reinforced resin material, and the sizing agent providing step 400 includes a sizing agent application step 401, a drying step 402 and a heat treatment step 403. It is not always necessary to include the drying step and the heat treatment step, but in FIG. 9, a pattern A in which the sizing agent providing step 400 including these sizing agent application step 401, drying step 402 and heat treatment step 403 is performed before a separation processing step 300 in the process in which the fiber bundle 100 is formed in a separated fiber bundle 180 through the separation processing step 300, and a pattern B in which it is performed after the separation processing step 300, are shown. Any timing of either pattern A or pattern B is possible.

Figure 10:
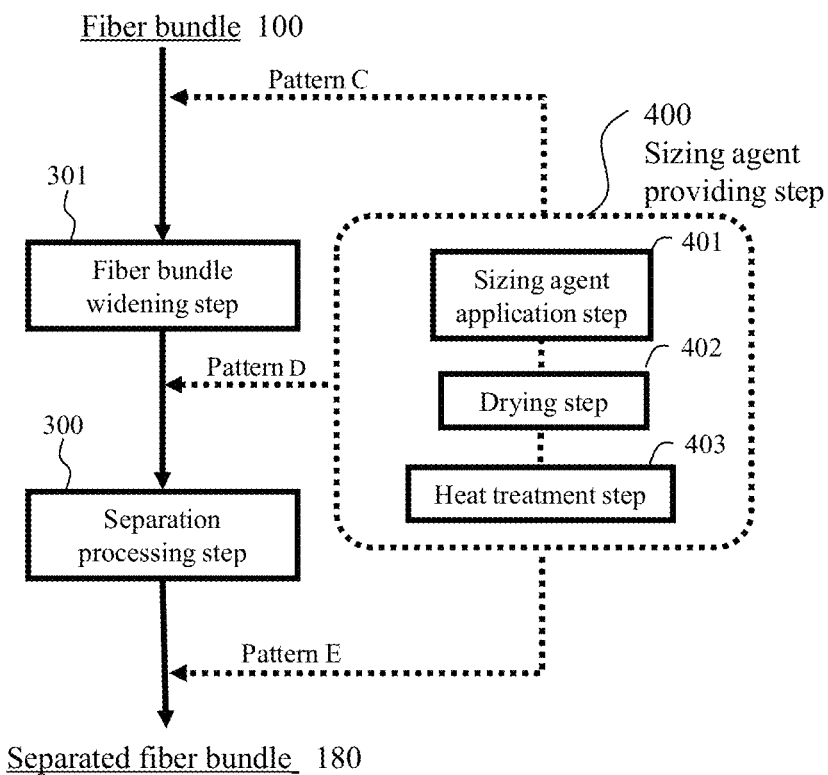
FIG. 10 is a process chart showing another example of a timing of sizing agent application to a reinforcing fiber bundle.

FIG. 10 shows a timing example of the sizing agent providing step 400 in the production process of the reinforcing fiber bundle including a fiber bundle widening step 301. In FIG. 10, in the process in which the fiber bundle 100 is formed into the separated fiber bundle 180 through the fiber bundle widening step 301 and the separation processing step 300 in this order, a pattern C in which the sizing agent providing step 400 similar to that in FIG. 9 is performed before the fiber bundle widening step 301, a pattern D in which it is performed between the fiber bundle widening step 301 and the separation processing step 300, and a pattern E in which it is performed after the separation processing step 300, are shown. Although any timing of pattern C, pattern D and pattern E is possible, the timing of pattern D is most preferable from the viewpoint that optimal separation processing can be achieved. Also in the patterns shown in this figure, it is not always necessary to include the drying step and the heat treatment step.

Figure 11:
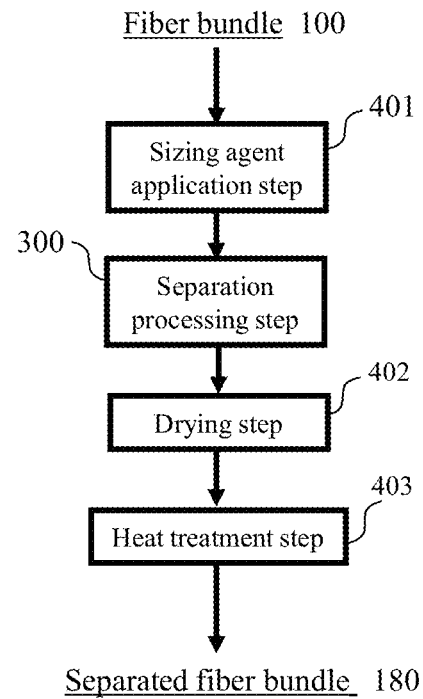
FIG. 11 is a process chart showing a further example of a timing of sizing agent application to a reinforcing fiber bundle.

FIG. 11 shows another timing example of a sizing agent application step, a drying step and a heat treatment step in the production process of the reinforcing fiber bundle forming a fiber-reinforced resin material. In the timing example shown in FIG. 11, the sizing agent application step 401, the drying step 402 and the heat treatment step 403 in the sizing agent providing step 400 shown in FIG. 9 are performed separately at respective different timings. The sizing agent application step 401 is performed before the separation processing step 300, and the drying step 402 and the heat treatment step 403 are performed after the separation processing step 300.

Figure 12:
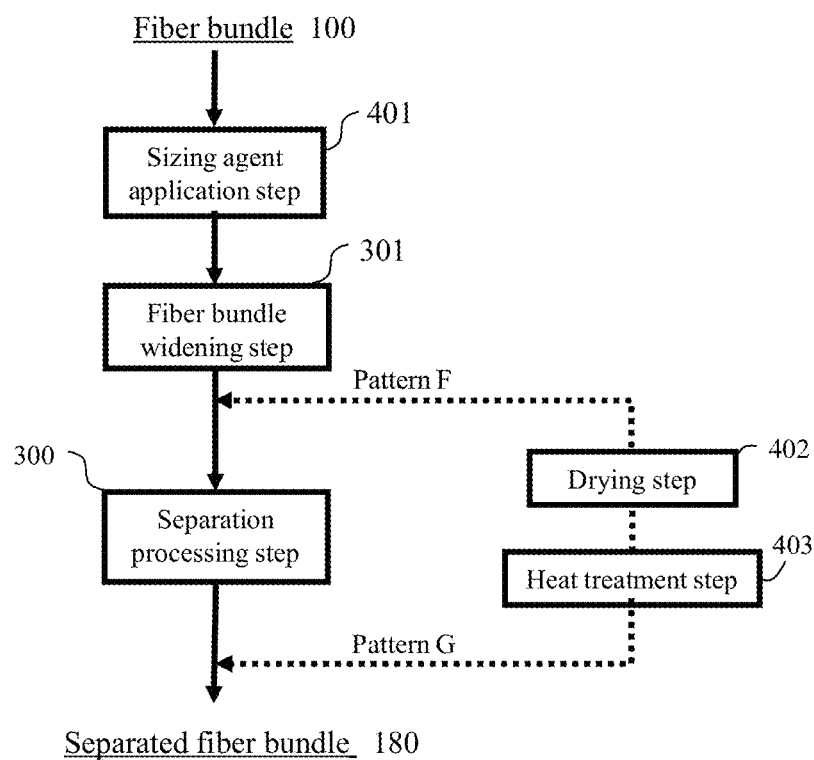
FIG. 12 is a process chart showing a still further example of a timing of sizing agent application to a reinforcing fiber bundle.

FIG. 12 shows a timing example of a sizing agent application step, a drying step and a heat treatment step in the production process of the reinforcing fiber bundle including a fiber bundle widening step. In the process in which the fiber bundle 100 is formed into the separated fiber bundle 180 through the fiber bundle widening step 301 and the separation processing step 300 in this order, the sizing agent application step 401 of the sizing agent providing step is performed before the fiber bundle widening step 301, and as to the drying step 402 and the heat treatment step 403, a pattern F, in which they are performed between the fiber bundle widening step 301 and the separation processing step 300, and a pattern G, in which they are performed after the separation processing step 300, are shown.

Figure 13:
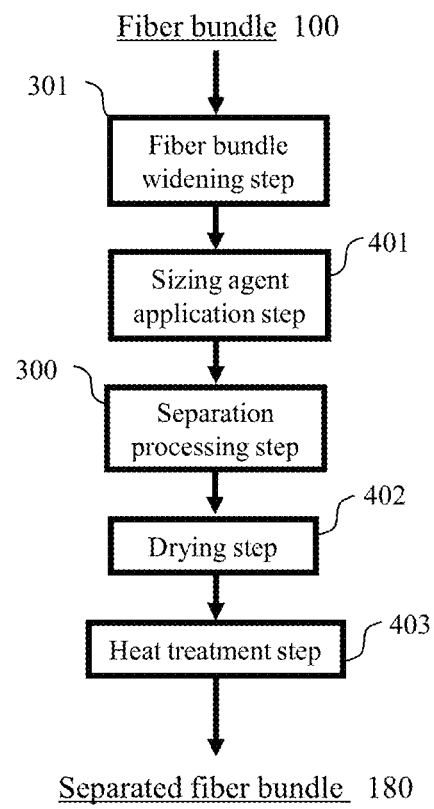
FIG. 13 is a process chart showing a still further example of a timing of sizing agent application to a reinforcing fiber bundle.

FIG. 13 shows a timing example of a sizing agent application step, a drying step and a heat treatment step in the production process of the reinforcing fiber bundle including a fiber bundle widening step. In the process in which the fiber bundle 100 is formed into the separated fiber bundle 180 through the fiber bundle widening step 301 and the separation processing step 300 in this order, a pattern example, in which the sizing agent application step 401 of the sizing agent providing step is performed between the fiber bundle widening step 301 and the separation processing step 300 and the drying step 402 and the heat treatment step 403 are performed after the separation processing step 300, is shown.

Thus, in the reinforcing fiber bundle, it is possible to provide a sizing agent at various timings.

Kind of Resin

The reinforcing fiber bundle constituting the fiber-reinforced resin material is as described above. On the other hand, the matrix resin impregnated into the reinforcing fiber bundle as described above is not particularly limited and, for example, thermosetting resins such as epoxy resin, unsaturated polyester resin, vinyl ester resin, phenol resin, epoxy acrylate resin, urethane acrylate resin, phenoxy resin, alkyd resin, urethane resin, maleimide resin, cyanate resin, and the like, and thermoplastic resins such as polyamide resin, polyacetal, polyacrylate, polysulfone, ABS, polyester, acryl, polybutylene terephthalate (PBT), polyethylene terephthalate (PET), polyethylene, polypropylene, polyphenylene sulfide (PPS), polyetheretherketone (PEEK), liquid crystal polymer, vinyl chloride, fluorine-based resin such as polytetrafluoroethylene, silicone and the like, are exemplified. In particular, it is preferred to use a polyamide-based resin as the above-described thermoplastic resin, and it is further preferred to compound an inorganic antioxidant to the polyamide. As the thermoplastic polyamide resin, for example, nylon 6, nylon 11 or nylon 12 obtained by ring-open polymerization of cyclic lactam or polycondensation of ω-aminocarboxylic acid, nylon 66, nylon 610, nylon 612, nylon 6T, nylon 6I, nylon 9T, nylon M5T or nylon MFD6 obtained by polycondensation of diamine and dicarboxylic acid, and a copolymerized nylon such as nylon 66·6·I or nylon 66·6·12 obtained by polycondensation of two or more diamines and dicarboxylic acids and the like, can be preferably used. In particular, nylons 6, 66 and 610 are preferable from the viewpoint of mechanical properties and cost. Further, it is preferred to compound an inorganic antioxidant to the polyamide.

Antioxidant

Further, as the inorganic antioxidant, copper halide or a derivative thereof can be used and, for example, copper iodide, copper bromide, copper chloride, a complex salt of mercaptobenzimidazole and copper iodide can be exemplified. Among them, copper iodide, and a complex salt of mercaptobenzimidazole and copper iodide can be preferably used. The amount of copper halide or a derivative thereof added is preferably 0.001 to 5 parts by weight with respect to 100 parts by weight of the thermoplastic polyamide resin. If the amount added is less than 0.001 part by weight, resin decomposition, smoke generation, and odor during preheating cannot be suppressed, and if it is 5 parts by weight or more, the improvement effect cannot be exhibited. Further, a range of 0.002 to 1 part by weight is preferred from the viewpoint of thermal stabilization effect and cost balance.

Production Method

The fiber-reinforced resin material having the above-described structure is produced by, for example, the following steps [A] to [C].

[A] a step of manufacturing a reinforcing fiber bundle aggregate in which reinforcing fiber bundles A comprising chopped fiber bundles each including 100 or more single fibers are randomly oriented two-dimensionally, each of the reinforcing fiber bundles having a number of fibers per unit width of 500 fibers/mm or more and 1,600 fibers/mm or less and a drape value (the aforementioned drape value) of 120 mm or more and 240 mm or less,

[B] a step of spraying, laminating, or applying a matrix resin onto the reinforcing fiber bundle aggregate, and

[C] a step of impregnating the matrix resin.

In the above-described step [A], the reinforcing fiber bundle having the above-described properties is cut to, for example, a desired length, and sprayed in a sheet-like shape to form the reinforcing fiber bundle aggregate comprising the discontinuous fiber reinforcing fiber bundles A.

In the step [B], it can be performed to spray particles of the thermoplastic resin becoming the matrix resin onto the reinforcing fiber bundle aggregate obtained in the step [A], or laminate a sheet-shaped thermoplastic resin such as a film, a non-woven fabric or a woven fabric onto the reinforcing fiber bundle aggregate, or apply a molten resin. In the step [A], when the chopped fiber bundles A cut to a desired fiber length are sprayed in a sheet-like shape, at the same time, the thermoplastic resin particles may be sprayed and the thermoplastic resin may be mixed inside the reinforcing fiber bundle aggregate. Further, in a thermosetting resin, a paste-like resin can be applied.

Then, the above-described step [C] can be performed using a press machine, and the matrix resin is impregnated into the mat base material. The press machine is not particularly limited as long as it can achieve the temperature and pressure required for impregnation of the matrix resin, and a normal press machine with flat platens that move up and down, or a so-called double belt press machine having a mechanism in which a pair of endless steel belts run, can be used.

Temperature Condition

When the matrix resin is impregnated into the reinforcing fiber bundle aggregate comprising the reinforcing fiber bundles A of discontinuous fibers, the temperature of base material center of the laminated base material in which the reinforcing fiber bundles A and the matrix resin are laminated is set preferably at Tm+20° C. or higher, more preferably at Tm+30° C. or higher, and further preferably at Tm+40° C. or higher. The upper limit is preferably Td−10° C. or lower, more preferably Td−20° C. or lower, and further preferably Td−20° C. or lower. If the temperature of the base material center is lower than Tm+20° C., there is a fear that impregnation failure may occur. Further, if the upper limit becomes higher than Td−10° C., there is a fear that deterioration of the resin may progress and the properties of the molded article may decrease. Tm is a melting point of the matrix resin, and Td is a decomposition temperature of the matrix resin.

Further, at the time of impregnation, the base material center temperature is heated at Tm+20° C. or higher and Td−10° C. or lower preferably for 60 seconds or more, more preferably 120 seconds or more, and further preferably 180 seconds or more. The upper limit is preferably 330 seconds or less, more preferably 300 seconds or less, and further preferably 270 seconds or less. If the time when the temperature of the base material center heated at Tm+20° C. or higher and Td−10° C. or lower is less than 60 seconds, there is a fear that impregnation failure may occur, and if it exceeds 330 seconds, there is a possibility that deterioration of the resin may progress.

Further, at the time of impregnation, the base material center temperature is heated at Tm+30° C. or higher and Td−10° C. or lower preferably for 55 seconds or more, more preferably 110 seconds or more, and further preferably 165 seconds or more. The upper limit is preferably 280 seconds or less, more preferably 250 seconds or less, and further preferably 220 seconds or less. If the time when the temperature of the base material center heated at Tm+30° C. or higher and Td−10° C. or lower is less than 55 seconds, there is a fear that impregnation failure may occur, and if it exceeds 280 seconds, there is a possibility that deterioration of the resin may progress.

Furthermore, at the time of impregnation, the base material center temperature is heated at Tm+40° C. or higher and Td−10° C. or lower preferably for 50 seconds or more, more preferably 100 seconds or more, and further preferably 150 seconds or more. The upper limit is preferably 230 seconds or less, more preferably 200 seconds or less, and further preferably 170 seconds or less. If the time when the temperature of the base material center heated at Tm+40° C. or higher and Td−10° C. or lower is less than 50 seconds, there is a fear that impregnation failure may occur, and if it exceeds 230 seconds, there is a possibility that deterioration of the resin may progress.

After impregnating the reinforcing fiber bundle aggregate comprising the reinforcing fiber bundles A of discontinuous fibers with the matrix resin, when the heated laminated base material is cooled and solidified, the clearance of the molding machine is set preferably at L or more, more preferably at 1.05 L or more, and further preferably at 1.1 L or more. If it falls below the lower limit, there is a possibility that the heated laminated base material may flow. The upper limit is preferably 1.4 L or less, more preferably 1.3 L or less, and further preferably 1.2 L or less. If it exceeds the upper limit, there is a fear that impregnation failure may occur. L is a theoretical thickness of the fiber-reinforced resin material when the matrix resin is completely impregnated into the mat base material comprising the reinforcing fiber bundles of discontinuous fibers so that there are no voids.

In the fiber-reinforced resin material obtained by the above-described series of steps, since the reinforcing fiber bundle having specific properties is used, and the porosity in the molding material is within the above-described range, productivity can be improved and, in addition, it becomes possible to exhibit high mechanical properties as a molded article using such a molding material, and the flowability during molding is also excellent.

EXAMPLES

Hereinafter, the details of our materials and methods will be explained using Examples. The respective measurement methods, calculation methods and evaluation methods are as follows.

(1) Method of Measuring Porosity of Fiber-Reinforced Resin Material

The fiber-reinforced resin material was cut in the thickness direction, and a sample for section observation was taken. To prevent the embedding resin from impregnating the voids of the sample, the sample was wrapped with a tape and embedded with EpoKwick Resin (20-8136-128) and EpoKwick Hardener (20-8138-032), and then, the cut surface was exposed by polishing the embedded sample.

Figure 16:
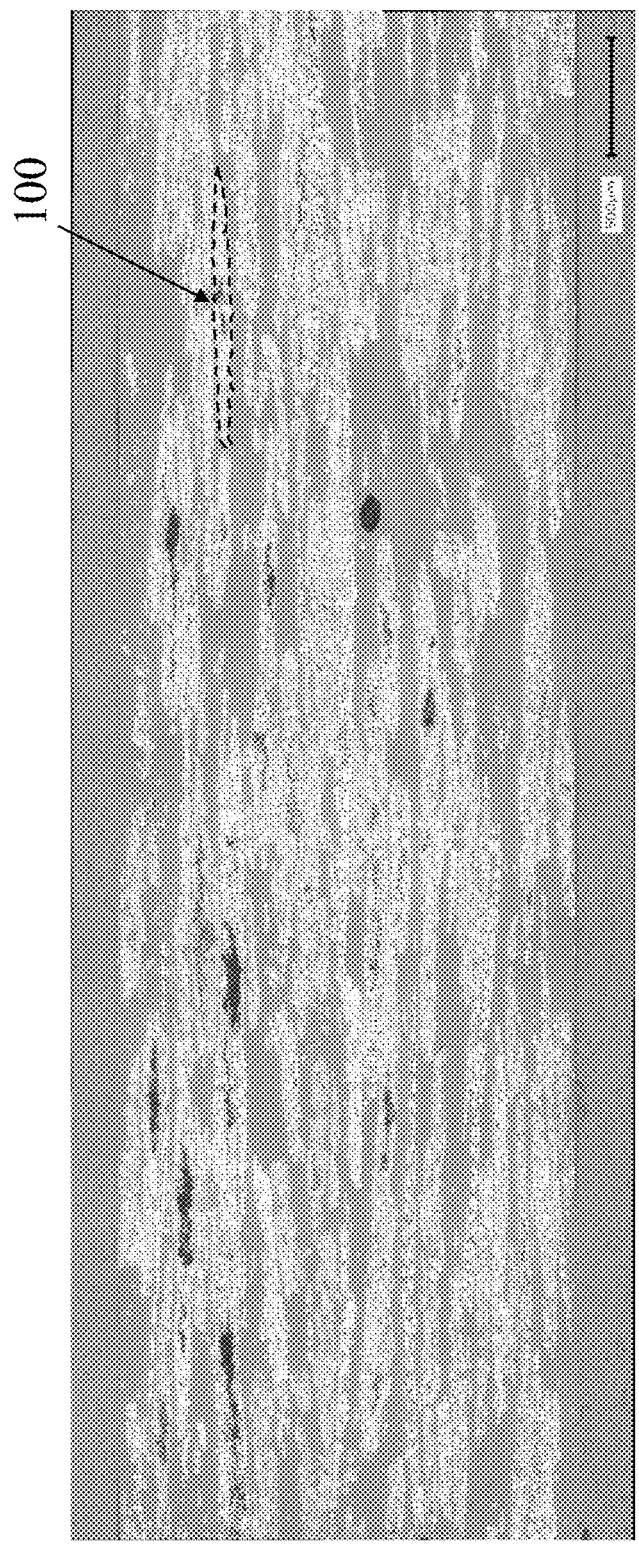
FIG. 16 is a sectional observation view showing an example of a fiber-reinforced resin material.
Figure 17A:
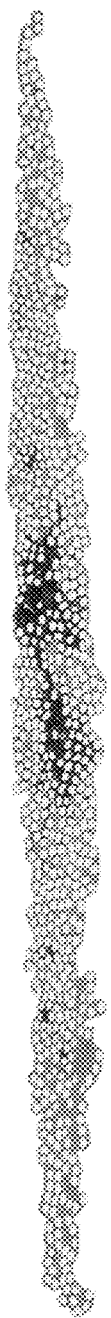
FIG. 17 shows sectional observation views showing an example of a fiber bundle forming a fiber-reinforced resin material, in which (a) is a sectional view of a fiber bundle before analysis, (b) is a sectional view obtained by binarizing and extracting only fiber portions, (c) is a sectional view obtained by binarizing and extracting only void portions, and (d) is a sectional view obtained by binarizing and extracting only resin portions.
Figure 17B:
Figure 17C:
Figure 17D:

The cut surface of the polished sample was photographed using an optical microscope (VHX-6000 supplied by KEYENCE CORPORATION) at an effective pixel count of 1,600 (H)×1,200 (V) and an imaging magnification of 300 times, and a sectional view of the material thickness range with a length of 50 mm was obtained. The obtained sectional view was binarized using an image analysis software ImageJ, and the respective value were referred to as $v_{f1}$: area of fibers other than fiber bundles A (mm$^2$), $v_{f2}$: area of fibers in fiber bundles A (mm$^2$), $v_{m1}$: resin layer area (mm$^2$), $v_{m2}$: resin area in fiber bundles A (mm$^2$), $p_1$: area of voids present in resin layer (mm$^2$) and $p_2$: area of voids present in fiber bundles A (mm$^2$). The volume porosity (−) of the fiber-reinforced resin material was calculated assuming that the area ratio in the sectional view was the same as the volume ratio. Further, as to the reinforcing fiber bundle A, a fiber bundle composed of 100 or more fibers was determined as one bundle, and a fiber bundle in which the entire section of the fiber bundle was observed in the sectional view was picked up. The broken fiber bundle section was connected to the continuous section of the reinforcing fiber bundle photographed in another the sectional view to form one bundle, and the analysis was performed. An example of analysis is shown in FIGS. 16 and 17. FIG. 16 is an example of the analyzed sectional view (a part). FIG. 17 is an example of the section of the analyzed fiber bundle, and (b), (c) and (d) indicate the areas of the reinforcing fiber portion in the fiber bundle, the void portion in the fiber bundle, and the resin portion in the fiber bundle (black part), extracted by the image analysis, respectively. In the example, the brightness thresholds were binarized with the void area 0 to 66, the resin area 67 to 195, and the fiber area 196 to 255, and the respective areas were calculated. Because the brightness differs depending upon the image at the time of photographing, it is necessary to appropriately set the brightness threshold value for each image, which is not as described above for all images. Each porosity was calculated from the respective determined parameters from the aforementioned equations (1), (3) and (4).

(2) Measurement of Fiber Content

The fiber content was calculated from equation (5) from the respective parameters obtained at the time of measuring the porosity of the fiber-reinforced resin material.

(3) Calculation of Bundle Ratio

From the sectional view obtained in the same manner as the method of measuring the porosity of the fiber-reinforced resin material, the bundle ratio (weight ratio) was calculated by dividing the area occupied by the fiber bundles, each of which has a number of fibers within the bundle of 100 or more fibers, among the reinforcing fiber bundles forming the fiber-reinforced resin material, with the area of all fibers in the sectional view of the fiber-reinforced resin material.

(4) Measurement of Fiber Bundle Thickness (after Impregnation)

The section of the fiber bundle picked up when measuring the porosity of the fiber-reinforced resin material from the sectional view obtained in the same manner as the method of measuring the porosity of the fiber-reinforced resin material was analyzed using an image analysis software ImageJ, and the thickness of the thickest portion of the reinforcing fiber bundle in the direction perpendicular to the bundle width was measured and it was referred to as a fiber bundle thickness. The fiber bundle thicknesses of about 500 bundles at each level were measured, and the number average value thereof was referred to as an average fiber bundle thickness (mm).

(5) Average Lamination Number of Fiber Bundles

From the sectional view obtained in the same manner as the method of measuring the porosity of the fiber-reinforced resin material, the number of fiber bundles A laminated in the thickness direction of the fiber-reinforced resin material was counted, and by dividing it with the thickness of the fiber-reinforced resin material, the lamination number of fiber bundles A was determined. The number average value of 30 points measured at intervals of 1 mm or more in the width direction (direction orthogonal to the thickness direction) was referred to as an average lamination number of fiber bundles.

(6) Method of Measuring the Average Number of Fibers

The mass a (mg/m) of a filament with a length of 1 m was derived from the mass per 1 m of the reinforcing fiber bundle and the number of filaments before the separation processing. Next, the fiber length 1 (mm) and mass b (mg) of the reinforcing fiber bundle prepared by cutting the separation-processed reinforcing fiber bundle to a length of about 10 mm were measured, and the number of fibers was derived from the equation below. The average number of fibers was determined as the average value of the numbers of fibers of total 20 cut reinforcing fiber bundles.

Number of fibers of reinforcing fiber bundle=($b$×1,000/($a$×1))

(7) Method of Measuring Adhesion Amount of Sizing Agent 5 g of the reinforcing fiber bundle to which the sizing agent was adhered taken and put into a heat-resistant container. Next, this container was dried at 80° C. under a vacuum condition for 24 hours, cooled down to a room temperature while being careful not to absorb moisture and, thereafter, the mass of the weighed reinforcing fibers was referred to as m1 (g), and then the whole container was placed in a nitrogen atmosphere to perform ashing treatment of the reinforcing fibers at a condition of 500° C. for 15 minutes. It was cooled to room temperature while being careful not to absorb moisture, and the mass of the weighed reinforcing fibers was referred to as m2 (g). Through the above-described treatment, the amount of the sizing agent adhered to the reinforcing fibers was determined by the equation below. The measurement was performed on 10 reinforcing fiber bundles, and the average value was calculated.

$$\text{Adhesion amount(mass \%)} = 100 \times \{(m1-m2)/m1\}$$

(8) Method of Measuring Thermal Decomposition Start Temperature

The thermal decomposition start temperature of the sizing agent was measured as follows. First, 5 mg of the reinforcing fiber bundle applied with the sizing agent was taken, dried at 110° C. for 2 hours, and then cooled in a desiccator at room temperature for 1 hour. Thereafter, it is weighed and TGA measurement was performed in an air atmosphere. The air flow rate was set at 50 ml/min, the temperature elevation rate was set at 10° C./min, and the mass reduction from the room temperature to 650° C. was measured. In the TGA curve where the vertical axis was the mass ratio (%) of the sized yarn to the initial mass and the horizontal axis was the temperature (° C.), the temperature at which the mass reduction rate (%/° C.) was maximized, and the temperature closest to it on the lower temperature side at which the mass reduction rate was minimized, were searched, and the intersection of tangents thereof was defined as a thermal decomposition start temperature.

However, the definition of the thermal decomposition start temperature is applied to the state after the chemical modification of the sizing agent and before the impregnation of the matrix resin. When the thermal decomposition start temperature of the reinforcing fiber bundle applied with the sizing agent cannot be measured, the sizing agent can be used instead of the reinforcing fiber bundle.

(9) Measurement of Bundle Thickness of Partially Separated Fiber Bundle

The thicknesses of bundle separated at an interval of 30 cm in the lengthwise direction (fiber direction) of the partially separated fiber bundle were measured at 20 points, and the average value thereof was referred to as an average partially separated fiber bundle thickness.

(10) Method of Measuring Width of Partially Separated Fiber Bundle

The widths of bundle separated at an interval of 30 cm in the lengthwise direction (fiber direction) of the partially separated fiber bundle were measured at 20 points, and the average value thereof was referred to as an average partially separated fiber bundle width.

(11) Number of Fibers Per Unit Width

The number of fibers per unit width was determined by dividing the average number of fibers with the average fiber bundle width.

(12) Measurement of Drape Value

Figure 14:
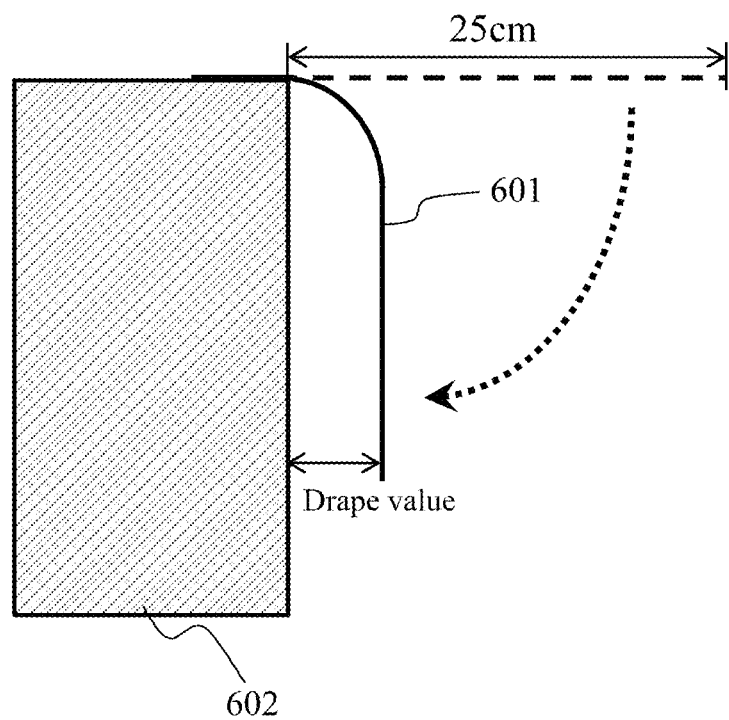
FIG. 14 is a schematic diagram showing a method of measuring a drape value.
Figure 15:
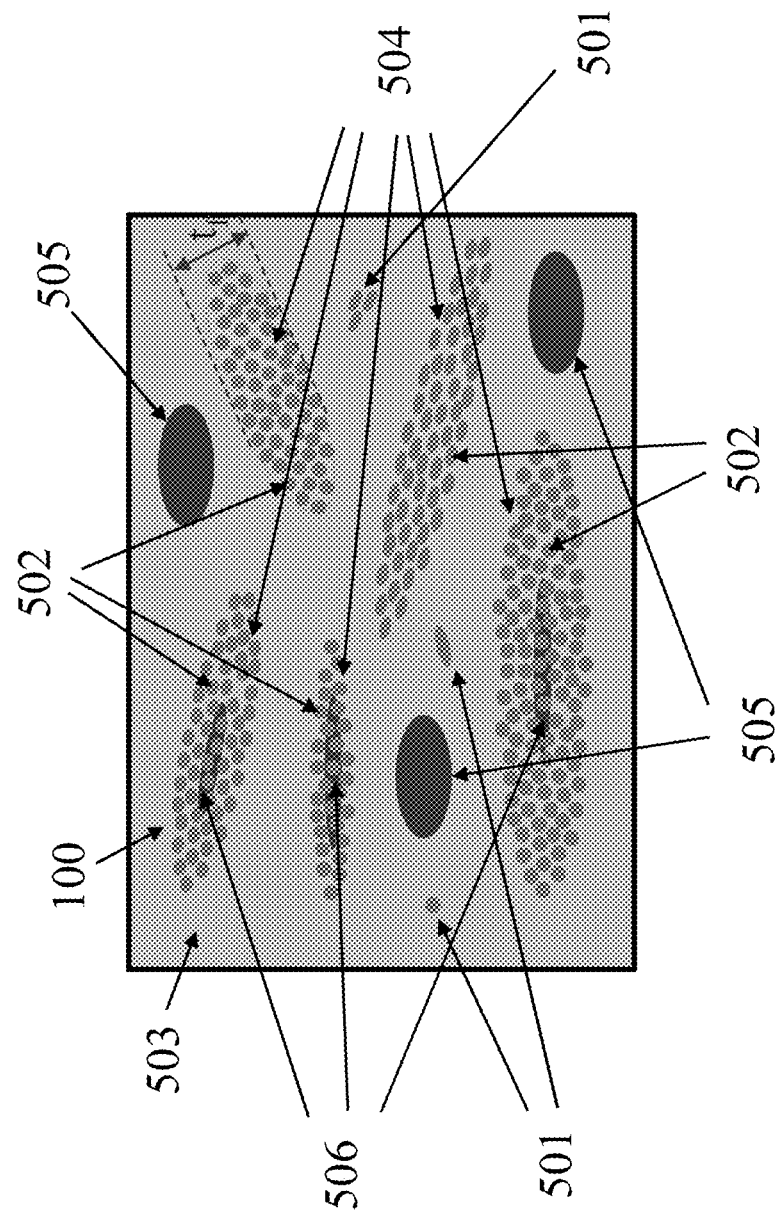
FIG. 15 is a schematic sectional view of a fiber-reinforced resin material.

A partially separated fiber bundle cut to 30 cm was straightened and placed on a flat table, and we confirmed that it was not curved or twisted. When curve or twist occurs, it is preferred to remove it by heating at 100° C. or lower or pressurizing at 0.1 MPa or lower. As shown in FIG. 14, in an atmosphere of 23±5° C., a partially separated fiber bundle (sample 601 of the reinforcing fiber bundle) cut to 30 cm was fixed on the end portion of the rectangular parallelepiped table 602, and at this time, the partially separated fiber bundle was fixed to protrude from the end of the table 602 by a length of 25 cm. Namely, the portion at 5 cm from the end of the partially separated fiber bundle was set to come to the end of the table 602. After allowing to stand for 5 minutes in this state, the shortest distance between the tip of the partially separated fiber bundle which is not fixed to the table 602 and the side surface of the table was measured and defined as a drape value D.

(13) Evaluation Method of Mechanical Properties

The fiber-reinforced resin material was stamping molded by the method described later to obtain a flat plate stamping molded article having a size of 500×500 mm. The lengthwise direction of the flat plate is set to 0°, 16 test pieces (32 pieces in total) each having a size of 100×25×2 mm were cut out from the obtained flat plate from the 0° and 90° directions, respectively, and the bending test was carried out in accordance with JIS K7074 (1988). The average value of the flexural strengths of totally 32 pieces was referred to as an average flexural strength. An average flexural strength of less than 200 MPa was determined as C, 200 MPa or more and less than 350 MPa was determined as B, and 350 MPa or more was determined as A.

(14) Evaluation of Production Speed

The production speed was calculated by dividing the fiber-reinforced resin material of 10 m by the time required when producing it. Less than 0.4 m/min was determined as C, 0.4 m/min or more and less than 0.6 m/min was determined as B, and 0.6 m/min or more was determined as A.

Raw Materials

Reinforcing fiber bundle: A carbon fiber bundle ("PX35-13" supplied by ZOLTEK CORPORATION, number of fibers: 50,000) was used.

Thermoplastic resin sheet: A sheet was prepared using a polyamide masterbatch made of a polyamide 6 resin ("Amilan" (registered trademark) CM1001 supplied by Toray Industries, Inc.).

Sizing agent 1: Water-soluble polyamide ("T-70" supplied by Toray Industries, Inc.) was used.

Sizing agent 2: Water-soluble polyamide ("A-90" supplied by Toray Industries, Inc.) was used. Production method of fiber-reinforced resin material The reinforcing fiber bundle was unwound at a constant speed of 10 m/min using a winder, passed through a vibrating widening roll vibrating in the axial direction at 10 Hz, widened, and after performing a widening treatment, a widened fiber bundle widened to an arbitrary width was obtained by being passed through a width-regulating roll.

Thereafter, the widened fiber bundle was continuously immersed in a sizing agent diluted with purified water. Then, the widened fiber bundle applied with the sizing agent was provided to a hot roller at 250° C. and a drying oven at 250° C. (in an air atmosphere), dried to remove moisture, and heat treated for 1.5 minutes.

A separation means, in which iron plates for separation processing each having a projection shape with a thickness of 0.2 mm, a width of 3 mm and a height of 20 mm were set in parallel at equal intervals in the width direction of the reinforcing fiber bundle, was prepared. This separation means was intermittently inserted into and removed from the widened fiber bundle that had been heat treated to obtain a reinforcing fiber bundle having an arbitrary division number.

At this time, the separation means repeatedly performed the operation to create the separation-processed section in which the separation means was pierced for 3 seconds and the not-separation-processed section in which the separation means was removed for 0.2 second with respect to the widened fiber bundle traveling at a constant speed of 10 m/min.

In the obtained reinforcing fiber bundle, the fiber bundle was separated in the width direction in the separation-processed section to have a target average number of fibers, and at least at one end portion of at least one separation-processed section, an entanglement accumulation part, formed by accumulating entangled parts each in which single fibers were interlaced, was formed.

Further, by changing the width of the width regulating roll after the widening treatment and performing the other treatments in the same manner, a partially separated fiber bundle in which the number of fibers per unit width was changed was prepared. The measurement of the number of fibers per unit width and the bundle thickness and the drape test of the prepared partially separated fiber bundle were carried out. The results are shown in Table 1.

amount of the sizing agent including the sizing agent 1 was 3.0% by mass, was produced.

Reference Example 5

As shown in Table 1, a partially separated fiber bundle, in which the number of fibers per unit width of the reinforcing fiber bundle was 2,010 fibers/mm and the total adhesion amount of the sizing agent including the sizing agent 1 was 3.2% by mass, was produced.

Reference Example 6

As shown in Table 1, a partially separated fiber bundle, in which the number of fibers per unit width of the reinforcing fiber bundle was 3,570 fibers/mm and the total adhesion amount of the sizing agent including the sizing agent 1 was 3.2% by mass, was produced.

Reference Example 7

By changing the sizing agent to be applied from the sizing agent 1 to the sizing agent 2 and performing the same treatment, as shown in the Table, a partially separated fiber

TABLE 1

|  |  | Reference Example 1 | Reference Example 2 | Reference Example 3 | Reference Example 4 | Reference Example 5 | Reference Example 6 | Reference Example 7 |
|---|---|---|---|---|---|---|---|---|
| Kind of sizing agent | — | — | Sizing agent 1 | Sizing agent 1 | Sizing agent 1 | Sizing agent 1 | Sizing agent 1 | Sizing agent 2 |
| Number of single fibers per unit width of reinforcing fiber bundle | filers/mm | 860 | 1070 | 1290 | 1430 | 2010 | 3570 | 1420 |
| Drape value D | mm | 200 | 220 | 225 | 230 | 240 | 245 | 235 |
| Thickness of partially separated fiber bundle | mm | 0.07 | 0.08 | 0.09 | 0.1 | 0.14 | 0.25 | 0.1 |

Reference Example 1

As shown in Table 1, a partially separated fiber bundle, in which the number of fibers per unit width of the reinforcing fiber bundle was 860 fibers/mm and the total adhesion amount of the sizing agent including the sizing agent 1 was 3.2% by mass, was produced.

Reference Example 2

As shown in Table 1, a partially separated fiber bundle, in which the number of fibers per unit width of the reinforcing fiber bundle was 1,070 fibers/mm and the total adhesion amount of the sizing agent including the sizing agent 1 was 3.0% by mass, was produced.

Reference Example 3

As shown in Table 1, a partially separated fiber bundle, in which the number of fibers per unit width of the reinforcing fiber bundle was 1,290 fibers/mm and the total adhesion amount of the sizing agent including the sizing agent 1 was 3.1% by mass, was produced.

Reference Example 4

As shown in Table 1, a partially separated fiber bundle, in which the number of fibers per unit width of the reinforcing fiber bundle was 1,430 fibers/mm and the total adhesion bundle, in which the number of fibers per unit width of the reinforcing fiber bundle was 3,570 fibers/mm and the total adhesion amount of the sizing agent including the sizing agent 2 was 3.2% by mass, was produced.

Subsequently, the obtained partially separated fiber bundle was continuously inserted into a rotary cutter, the fiber bundle was cut to an arbitrary fiber length, and sprayed to be uniformly dispersed, to obtain a discontinuous fiber bundle aggregate in which the fiber orientation was isotropic.

Example 1

Next, after a discontinuous fiber aggregate (5 layers) and a resin sheet (6 layers) were alternately laminated so that the weight ratio of the carbon fibers and the matrix resin of the discontinuous fiber bundle aggregate became 45:55 (theoretical thickness L=2 mm of fiber-reinforced resin material when completely impregnated so that there were no voids), it was sandwiched from above and below the laminate with a double belt press machine having an arbitrary gap, and by impregnating the thermoplastic resin into the discontinuous fiber bundle aggregate at conditions of a heating zone (350° C., heating time: 257 seconds and clearance: 2.3 mm), a cooling zone (50° C., cooling time: 42 seconds and clearance: 2.1 mm), and a production speed of 0.7 m/min, a sheet-shaped fiber-reinforced resin material was obtained. Further, a thermocouple was inserted into the center of the laminated base material in advance, and the temperature inside the base material during heating of the base material was measured to obtain a base material temperature profile during impregnation. When the base material temperature profile at the time of impregnation was confirmed, the time of Tm+20° C. or higher was 120 seconds. Thereafter, the obtained fiber-reinforced resin material was cut into a predetermined size, and the porosity of the fiber-reinforced resin material and the fiber bundle thickness were measured. The results are shown in Table 2.

Subsequently, the obtained fiber-reinforced resin material was cut into a size of 490×490 mm, the fiber-reinforced resin material was heated to 280° C. using an IR heater, and then, placed in a flat plate mold heated to 150° C., and by cold pressing it at a press pressure of 10 MPa for 30 seconds, a stamping molded article was obtained. Subsequently, the mechanical properties of the molded article were evaluated. The results are shown in Table 2.

Example 2

A sheet-shaped fiber-reinforced resin material was obtained in the same manner as in Example 1 other than a condition where Reference Example 2 was used for the fiber bundle. When the base material temperature profile at the time of impregnation was confirmed, the time of Tm+20° C. or higher was 111 seconds. The same conditions as in Example 1 except for the impregnation condition were employed.

Thereafter, the obtained fiber-reinforced resin material was cut into a predetermined size, and the porosity of the fiber-reinforced resin material and the fiber bundle thickness were measured. The results are shown in Table 2.

Subsequently, the obtained fiber-reinforced resin material was stamping molded, and the mechanical properties of the molded article were evaluated. The results are shown in Table 2.

Comparative Example 1

By impregnating the thermoplastic resin into the discontinuous fiber bundle aggregate under conditions at the time of producing the fiber-reinforced resin material (at the time of resin impregnation) of a heating zone (350° C., heating time: 180 seconds and clearance: 2.3 mm), a cooling zone (50° C., cooling time: 30 seconds and clearance: 2.1 mm), and a production speed of 1 m/min, a sheet-shaped fiber-reinforced resin material was obtained. When the base material temperature profile at the time of impregnation was confirmed, the time of Tm+20° C. or higher was 58 seconds. The same conditions as in Example 2 except for the impregnation condition were employed.

Thereafter, the obtained fiber-reinforced resin material was cut into a predetermined size, and the porosity of the fiber-reinforced resin material and the fiber bundle thickness were measured. The results are shown in Table 2.

Subsequently, the obtained fiber-reinforced resin material was stamping molded, and the mechanical properties of the molded article were evaluated. The results are shown in Table 2.

Example 3

After a discontinuous fiber aggregate (5 layers) and a resin sheet (6 layers) were alternately laminated so that the weight ratio of the carbon fibers and the matrix resin of the discontinuous fiber bundle aggregate became 40:60 (theoretical thickness L=2 mm of fiber-reinforced resin material when completely impregnated so that there were no voids), it was sandwiched from above and below the laminate with a double belt press machine having an arbitrary gap, and by impregnating the thermoplastic resin into the discontinuous fiber bundle aggregate under conditions at the time of producing the fiber-reinforced resin material (at the time of resin impregnation) of a heating zone (350° C., heating time: 257 seconds and clearance: 2.3 mm), a cooling zone (50° C., cooling time: 42 seconds and clearance: 2.2 mm), and a production speed of 0.7 m/min, a sheet-shaped fiber-reinforced resin material was obtained. When the base material temperature profile at the time of impregnation was confirmed, the time of Tm+20° C. or higher was 90 seconds.

Thereafter, the obtained fiber-reinforced resin material was cut into a predetermined size, and the porosity of the fiber-reinforced resin material and the fiber bundle thickness were measured. The results are shown in Table 2.

Subsequently, the obtained fiber-reinforced resin material was stamping molded, and the mechanical properties of the molded article were evaluated. The results are shown in Table 2.

Comparative Example 2

Using Reference Example 4 for the fiber bundle, a sheet-shaped fiber-reinforced resin material was obtained by impregnating the thermoplastic resin into the discontinuous fiber bundle aggregate under conditions at the time of producing the fiber-reinforced resin material (at the time of resin impregnation) of a heating zone (350° C., heating time: 514 seconds and clearance: 2.3 mm), a cooling zone (50° C., cooling time: 85 seconds and clearance: 2.1 mm), and a production speed of 0.35 m/min. When the base material temperature profile at the time of impregnation was confirmed, the time of Tm+20° C. or higher was 334 seconds.

Thereafter, the obtained fiber-reinforced resin material was cut into a predetermined size, and the porosity of the fiber-reinforced resin material and the fiber bundle thickness were measured. The results are shown in Table 2. The same conditions as in Example 1 were employed except the condition of using Reference Example 4 as the fiber bundle and the impregnation condition.

Subsequently, the obtained fiber-reinforced resin material was stamping molded, and the mechanical properties of the molded article were evaluated. The results are shown in Table 2.

Example 4

By impregnating the thermoplastic resin into the discontinuous fiber bundle aggregate under conditions at the time of producing the fiber-reinforced resin material (at the time of resin impregnation) of a heating zone (350° C., heating time: 450 seconds and clearance: 2.3 mm), a cooling zone (50° C., cooling time: 75 seconds and clearance: 2.1 mm), and a production speed of 0.4 m/min, a sheet-shaped fiber-reinforced resin material was obtained. When the base material temperature profile at the time of impregnation was confirmed, the time of Tm+20° C. or higher was 301 seconds.

Thereafter, the obtained fiber-reinforced resin material was cut into a predetermined size, and the porosity of the fiber-reinforced resin material and the fiber bundle thickness were measured. The results are shown in Table 2. The same conditions as in Comparative Example 2 except for the impregnation condition were employed.

Subsequently, the obtained fiber-reinforced resin material was stamping molded, and the mechanical properties of the molded article were evaluated. The results are shown in Table 2.

Example 5

By impregnating the thermoplastic resin into the discontinuous fiber bundle aggregate under conditions at the time of producing the fiber-reinforced resin material (at the time of resin impregnation) of a heating zone (350° C., heating time: 450 seconds and clearance: 2.3 mm), a cooling zone (50° C., cooling time: 75 seconds and clearance: 2.8 mm), and a production speed of 0.4 m/min, a sheet-shaped fiber-reinforced resin material was obtained. When the base material temperature profile at the time of impregnation was confirmed, the time of Tm+20° C. or higher was 309 seconds.

Thereafter, the obtained fiber-reinforced resin material was cut into a predetermined size, and the porosity of the fiber-reinforced resin material and the fiber bundle thickness were measured. The results are shown in Table 2. The same conditions as in Comparative Example 2 except for the impregnation condition were employed.

Subsequently, the obtained fiber-reinforced resin material was stamping molded, and the mechanical properties of the molded article were evaluated. The results are shown in Table 2.

Comparative Example 3

By impregnating the thermoplastic resin into the discontinuous fiber bundle aggregate under conditions at the time of producing the fiber-reinforced resin material (at the time of resin impregnation) of a heating zone (350° C., heating time: 450 seconds and clearance: 2.3 mm), a cooling zone (50° C., cooling time: 75 seconds and clearance: 3.0 mm), and a production speed of 0.4 m/min, a sheet-shaped fiber-reinforced resin material was obtained. When the base material temperature profile at the time of impregnation was confirmed, the time of Tm+20° C. or higher was 285 seconds.

Thereafter, the obtained fiber-reinforced resin material was cut into a predetermined size, and the porosity of the fiber-reinforced resin material and the fiber bundle thickness were measured. The results are shown in Table 2. The same conditions as in Comparative Example 2 except for the impregnation condition were employed.

Comparative Example 4

By impregnating the thermoplastic resin into the discontinuous fiber bundle aggregate under conditions at the time of producing the fiber-reinforced resin material (at the time of resin impregnation) of a heating zone (350° C., heating time: 180 seconds and clearance: 2.3 mm), a cooling zone (50° C., cooling time: 30 seconds and clearance: 2.8 mm), and a production speed of 1 m/min, a sheet-shaped fiber-reinforced resin material was obtained. When the base material temperature profile at the time of impregnation was confirmed, the time of Tm+20° C. or higher was 50 seconds.

Thereafter, the obtained fiber-reinforced resin material was cut into a predetermined size, and the porosity of the fiber-reinforced resin material and the fiber bundle thickness were measured. The results are shown in Table 2. The same conditions as in Comparative Example 2 except for the impregnation condition were employed.

Example 6

By impregnating the thermoplastic resin into the discontinuous fiber bundle aggregate under conditions at the time of producing the fiber-reinforced resin material (at the time of resin impregnation) of a heating zone (350° C., heating time: 360 seconds and clearance: 2.3 mm), a cooling zone (50° C., cooling time: 60 seconds and clearance: 2 mm), and a production speed of 0.5 m/min, a sheet-shaped fiber-reinforced resin material was obtained. When the base material temperature profile at the time of impregnation was confirmed, the time of Tm+20° C. or higher was 255 seconds.

Thereafter, the obtained fiber-reinforced resin material was cut into a predetermined size, and the porosity of the fiber-reinforced resin material and the fiber bundle thickness were measured. The results are shown in Table 2. The same conditions as in Comparative Example 2 except for the impregnation condition were employed.

Example 7

By impregnating the thermoplastic resin into the discontinuous fiber bundle aggregate under conditions at the time of producing the fiber-reinforced resin material (at the time of resin impregnation) of a heating zone (350° C., heating time: 300 seconds and clearance: 2.3 mm), a cooling zone (50° C., cooling time: 50 seconds and clearance: 2 mm), and a production speed of 0.5 m/min, a sheet-shaped fiber-reinforced resin material was obtained. When the base material temperature profile at the time of impregnation was confirmed, the time of Tm+20° C. or higher was 186 seconds.

Thereafter, the obtained fiber-reinforced resin material was cut into a predetermined size, and the porosity of the fiber-reinforced resin material and the fiber bundle thickness were measured. The results are shown in Table 2. The same conditions as in Comparative Example 2 except for the impregnation condition were employed.

Example 8

Using Reference Example 7 for the fiber bundle, a sheet-shaped fiber-reinforced resin material was obtained by impregnating the thermoplastic resin into the discontinuous fiber bundle aggregate under conditions at the time of producing the fiber-reinforced resin material (at the time of resin impregnation) of a heating zone (350° C., heating time: 300 seconds and clearance: 2.3 mm), a cooling zone (50° C., cooling time: 50 seconds and clearance: 2 mm), and a production speed of 0.6 m/min. When the base material temperature profile at the time of impregnation was confirmed, the time of Tm+20° C. or higher was 171 seconds.

Thereafter, the obtained fiber-reinforced resin material was cut into a predetermined size, and the porosity of the fiber-reinforced resin material and the fiber bundle thickness were measured. The results are shown in Table 2. The same conditions as in Example 1 were employed except the condition of using Reference Example 7 as the fiber bundle and the impregnation condition.

Comparative Example 5

Using Reference Example 3 for the fiber bundle, a sheet-shaped fiber-reinforced resin material was obtained by impregnating the thermoplastic resin into the discontinuous fiber bundle aggregate under conditions at the time of producing the fiber-reinforced resin material (at the time of resin impregnation) of a heating zone (350° C., heating time: 180 seconds and clearance: 2.3 mm), a cooling zone (50° C., cooling time: 30 seconds and clearance: 2 mm), and a production speed of 1 m/min. When the base material temperature profile at the time of impregnation was confirmed, the time of Tm+20° C. or higher was 51 seconds.

Thereafter, the obtained fiber-reinforced resin material was cut into a predetermined size, and the porosity of the fiber-reinforced resin material and the fiber bundle thickness were measured. The results are shown in Table 2. The same conditions as in Example 1 were employed except the condition of using Reference Example 3 as the fiber bundle and the impregnation condition.

Example 9

By impregnating the thermoplastic resin into the discontinuous fiber bundle aggregate under conditions at the time of producing the fiber-reinforced resin material (at the time of resin impregnation) of a heating zone (350° C., heating time: 200 seconds and clearance: 2.3 mm), a cooling zone (50° C., cooling time: 33 seconds and clearance: 2 mm), and a production speed of 0.9 m/min, a sheet-shaped fiber-reinforced resin material was obtained. When the base material temperature profile at the time of impregnation was confirmed, the time of Tm+20° C. or higher was 80 seconds.

Thereafter, the obtained fiber-reinforced resin material was cut into a predetermined size, and the porosity of the fiber-reinforced resin material and the fiber bundle thickness were measured. The results are shown in Table 2. The same conditions as in Comparative Example 5 except for the impregnation condition were employed.

Comparative Example 6

By impregnating the thermoplastic resin into the discontinuous fiber bundle aggregate under conditions at the time of producing the fiber-reinforced resin material (at the time of resin impregnation) of a heating zone (350° C., heating time: 180 seconds and clearance: 2.3 mm), a cooling zone (50° C., cooling time: 30 seconds and clearance: 3 mm), and a production speed of 1 m/min, a sheet-shaped fiber-reinforced resin material was obtained. When the base material temperature profile at the time of impregnation was confirmed, the time of Tm+20° C. or higher was 54 seconds.

Thereafter, the obtained fiber-reinforced resin material was cut into a predetermined size, and the porosity of the fiber-reinforced resin material and the fiber bundle thickness were measured. The results are shown in Table 2. The same conditions as in Comparative Example 5 except for the impregnation condition were employed.

Example 10

Using Reference Example 5 for the fiber bundle, a sheet-shaped fiber-reinforced resin material was obtained by impregnating the thermoplastic resin into the discontinuous fiber bundle aggregate under conditions at the time of producing the fiber-reinforced resin material (at the time of resin impregnation) of a heating zone (350° C., heating time: 257 seconds and clearance: 2.3 mm), a cooling zone (50° C., cooling time: 42 seconds and clearance: 2.1 mm), and a production speed of 0.7 m/min. When the base material temperature profile at the time of impregnation was confirmed, the time of Tm+20° C. or higher was 127 seconds.

Thereafter, the obtained fiber-reinforced resin material was cut into a predetermined size, and the porosity of the fiber-reinforced resin material and the fiber bundle thickness were measured. The results are shown in Table 2. The same conditions as in Example 1 were employed except the condition of using Reference Example 5 as the fiber bundle and the impregnation condition.

Comparative Example 7

By impregnating the thermoplastic resin into the discontinuous fiber bundle aggregate under conditions at the time of producing the fiber-reinforced resin material (at the time of resin impregnation) of a heating zone (350° C., heating time: 180 seconds and clearance: 2.3 mm), a cooling zone (50° C., cooling time: 30 seconds and clearance: 2.1 mm), and a production speed of 1 m/min, a sheet-shaped fiber-reinforced resin material was obtained. When the base material temperature profile at the time of impregnation was confirmed, the time of Tm+20° C. or higher was 54 seconds.

Thereafter, the obtained fiber-reinforced resin material was cut into a predetermined size, and the porosity of the fiber-reinforced resin material and the fiber bundle thickness were measured. The results are shown in Table 2. The same conditions as in Example 10 except for the impregnation condition were employed.

Example 11

Using Reference Example 6 for the fiber bundle, a sheet-shaped fiber-reinforced resin material was obtained by impregnating the thermoplastic resin into the discontinuous fiber bundle aggregate under conditions at the time of producing the fiber-reinforced resin material (at the time of resin impregnation) of a heating zone (350° C., heating time: 257 seconds and clearance: 2.3 mm), a cooling zone (50° C., cooling time: 42 seconds and clearance: 2.1 mm), and a production speed of 0.7 m/min. When the base material temperature profile at the time of impregnation was confirmed, the time of Tm+20° C. or higher was 115 seconds.

Thereafter, the obtained fiber-reinforced resin material was cut into a predetermined size, and the porosity of the fiber-reinforced resin material and the fiber bundle thickness were measured. The results are shown in Table 2. The same conditions as in Example 1 were employed except the condition of using Reference Example 6 as the fiber bundle.

TABLE 2

| | Fiber bundle Mm | $V_f$ — | Bundle ratio — | $t_f$ mm | Average lamination number of fiber bundles Bundles/mm | $t_f \times P_f$ — | $P_f$ — | $t_f \times P_f$ mm | $P_c$ — | Production speed Determination | Strength Determination | Elastic modulus Determination |
|---|---|---|---|---|---|---|---|---|---|---|---|---|
| Example 1 | Reference Example 1 | 0.31 | 0.994 | 0.07 | 14 | 0.014 | 0.130 | 0.009 | 0.10 | A | A | A |
| Example 2 | Reference Example 2 | 0.33 | 0.997 | 0.08 | 13 | 0.008 | 0.062 | 0.005 | 0.06 | A | A | A |
| Comparative Example 1 | Reference Example 2 | 0.31 | 0.994 | 0.085 | 12 | 0.026 | 0.130 | 0.011 | 0.09 | A | B | C |
| Example 3 | Reference Example 2 | 0.26 | 0.996 | 0.08 | 8 | 0.013 | 0.071 | 0.006 | 0.10 | A | B | B |
| Comparative Example 2 | Reference Example 4 | 0.35 | 0.992 | 0.1 | 10 | 0.001 | 0.000 | 0.000 | 0.00 | C | A | A |
| Example 4 | Reference Example 4 | 0.33 | 0.997 | 0.1 | 11 | 0.001 | 0.000 | 0.000 | 0.02 | B | A | A |
| Example 5 | Reference Example 4 | 0.24 | 0.996 | 0.1 | 11 | 0.002 | 0.000 | 0.000 | 0.38 | B | A | A |
| Comparative Example 3 | Reference Example 4 | 0.21 | 0.995 | 0.11 | 10 | 0.021 | 0.006 | 0.001 | 0.41 | B | C | B |
| Comparative Example 4 | Reference Example 4 | 0.21 | 0.995 | 0.11 | 10 | 0.026 | 0.085 | 0.009 | 0.41 | A | C | B |
| Example 6 | Reference Example 4 | 0.34 | 0.997 | 0.1 | 10 | 0.001 | 0.031 | 0.003 | 0.02 | B | A | A |
| Example 7 | Reference Example 4 | 0.32 | 0.994 | 0.11 | 10 | 0.013 | 0.070 | 0.008 | 0.07 | A | A | A |
| Example 8 | Reference Example 7 | 0.31 | 0.997 | 0.11 | 10 | 0.013 | 0.065 | 0.007 | 0.08 | A | A | A |
| Comparative Example 5 | Reference Example 3 | 0.31 | 0.994 | 0.1 | 10 | 0.029 | 0.118 | 0.012 | 0.11 | A | C | C |
| Example 9 | Reference Example 3 | 0.30 | 0.993 | 0.1 | 10 | 0.032 | 0.096 | 0.010 | 0.11 | A | B | B |
| Comparative Example 6 | Reference Example 3 | 0.20 | 0.995 | 0.1 | 11 | 0.023 | 0.153 | 0.015 | 0.41 | A | C | C |
| Example 10 | Reference Example 5 | 0.31 | 0.997 | 0.15 | 7 | 0.017 | 0.060 | 0.009 | 0.08 | A | B | A |
| Comparative Example 7 | Reference Example 5 | 0.32 | 0.997 | 0.151 | 6 | 0.024 | 0.071 | 0.011 | 0.07 | A | C | C |
| Example 11 | Reference Example 6 | 0.33 | 0.994 | 0.26 | 3 | 0.011 | 0.030 | 0.008 | 0.05 | B | B | A |

The invention claimed is:

1. A fiber-reinforced resin material used for molding a fiber-reinforced resin that comprises a matrix resin and reinforcing fiber bundles A comprising chopped fiber bundles each including 100 or more single fibers, wherein a product of an average porosity within fiber bundles $P_{fav}$ (−) represented by equation (1) and an average fiber bundle thickness $t_{fav}$ (mm) represented by equation (2) is 0 mm or more and 0.01 mm or less and a porosity of composite $P_c$ (−) represented by equation (3) is 0.02 or more and 0.4 or less:

$$P_{fav} = \frac{1}{n}\sum_{i=1}^{n} \frac{p_{2i}}{v_{f2i} + v_{m2i} + p_{2i}} \tag{1}$$

$$t_{fav} = \frac{1}{n}\sum_{i=1}^{n} t_{fi} \tag{2}$$

$$P_c = \frac{\sum_{j=1}^{k} p_{1j} + \sum_{i=1}^{n} p_{2i}}{\sum_{x=1}^{l} v_{f1x} + \sum_{i=1}^{n}(v_{f2i} + v_{m2i} + p_{2i}) + v_{m1} + \sum_{j=1}^{k} p_{1j}} \tag{3}$$

wherein, i=1, 2, ... n, j=1, 2, ... k, x=1, 2, ... l, which are integers, and n, k, l represent, respectively, the number of all fiber bundles A, the number of voids, and the number of fibers other than the fiber bundles A included in a photographed sectional view, each parameter is:

$v_{f1}$: area occupied by fibers other than fiber bundles A (mm$^2$)
$v_{f2}$: area occupied by fibers in fiber bundles A (mm$^2$)
$v_{m1}$: resin layer area (mm$^2$)
$v_{m2}$: resin area in fiber bundles A (mm$^2$)
$p_1$: area of voids present in resin layer (mm$^2$)
$p_2$: area of voids present in fiber bundles A (mm$^2$)
$t_f$: thickness of fiber bundle A (mm),
and each parameter is a value calculated from image analysis after binarization of a sectional view prepared by observing a section of a cut surface of the fiber-reinforced resin material in its thickness direction with an optical microscope, and photographing it at effective pixels of 1,600 (H)×1,200 (V) and a photograph magnification of 300 times.

2. The fiber-reinforced resin material according to claim 1, wherein the product of the porosity $P_f$ (−) within the fiber bundle A represented by equation (4) and the thickness $t_f$ (mm) of the fiber bundle A is 0 mm or more and 0.03 mm or less:

$$P_f = \frac{p_2}{v_{f2} + v_{m2} + p_2}. \tag{4}$$

3. The fiber-reinforced resin material according to claim 1, wherein the reinforcing fiber bundle A is a chopped fiber bundle of a reinforcing fiber bundle having a number of fibers per unit width of 500 fibers/mm or more and 1,600 fibers/mm or less and a drape value defined as follows of 120 mm or more and 240 mm or less,
wherein the drape value a shortest distance between a tip of a reinforcing fiber bundle protruding by 250 mm from an end of a table and a side surface of the table measured at a condition where a sample of the reinforcing fiber bundle having a length of 300 mm is fixed on the end portion of the table of a rectangular parallelepiped in an atmosphere of 23±5° C.

4. The fiber-reinforced resin material according to claim 1, wherein a number average number of fibers of the reinforcing fiber bundles A is 100 or more and 4,000 or less.

5. The fiber-reinforced resin material according to claim 1, wherein a number average fiber length of the reinforcing fiber bundles A is 5 mm or more and 100 mm or less.

6. The fiber-reinforced resin material according to claim 1, wherein a weight ratio of the reinforcing fiber bundles A to all the reinforcing fibers is more than 99% by weight and 100% by weight or less.

7. The fiber-reinforced resin material according to claim 1, wherein the average fiber bundle thickness $t_{fav}$ of the reinforcing fiber bundles A is 0.01 mm or more and 0.3 mm or less.

8. The fiber-reinforced resin material according to claim 1, wherein an average lamination number of fiber bundles, which is a number average of the reinforcing fiber bundles A laminated in the thickness direction of the fiber-reinforced resin material, is 10 bundles/mm or more and 100 bundles/mm or less.

9. The fiber-reinforced resin material according to claim 1, wherein the matrix resin is a thermoplastic resin.

\* \* \* \* \*